United States Patent
Tholen et al.

(10) Patent No.: US 7,188,383 B2
(45) Date of Patent: Mar. 13, 2007

(54) ADAPTABLE CAB FLOOR ENGAGEMENT ASSEMBLY FOR COMMUTER AND CONVENTIONAL JET AIRCRAFT

(75) Inventors: Trent D. Tholen, Layton, UT (US); Glen O. West, West Haven City, UT (US); Daniel D. Pohly, Huntsville, UT (US); Thomas Chase, Ogden, UT (US); Kenneth Jensen, Ogden, UT (US); Catharine Wofford, Clinton, UT (US); Chris Hansen, South Weber, UT (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 11/139,724

(22) Filed: May 27, 2005

(65) Prior Publication Data

US 2005/0217039 A1    Oct. 6, 2005

Related U.S. Application Data

(62) Division of application No. 09/971,975, filed on Oct. 4, 2001, now Pat. No. 6,898,816.

(60) Provisional application No. 60/238,169, filed on Oct. 5, 2000.

(51) Int. Cl.
*E01F 15/00* (2006.01)
*E01F 15/10* (2006.01)

(52) U.S. Cl. ...................................................... 14/71.5

(58) Field of Classification Search ................. 14/71.5, 14/69.5; 414/358
See application file for complete search history.

(56) References Cited

U.S. PATENT DOCUMENTS

| | | | | |
|---|---|---|---|---|
| 5,761,757 A | * | 6/1998 | Mitchell et al. | 14/71.5 |
| 6,122,789 A | * | 9/2000 | Stephenson et al. | 14/71.5 |
| 6,898,816 B2 | * | 5/2005 | Tholen et al. | 14/71.5 |

* cited by examiner

Primary Examiner—Raymond Addie
(74) Attorney, Agent, or Firm—TraskBritt, P.C.

(57) ABSTRACT

An engagement structure adapted for securement to the end of an aircraft boarding bridge includes a floor, a first floor panel rotatably associated with the floor, and a second floor panel displaceably associated with the floor. The second floor panel is preferably mechanically associated with a drive assembly adapted for displacing the second floor panel relative to the first floor panel to provide a dimensionally adjustable floor area of a boarding bridge proximate the interface of the bridge and an aircraft serviced by the bridge. The engagement structure is adapted to accommodate the docking of the boarding bridge with aircraft having varied entry door configurations.

19 Claims, 31 Drawing Sheets

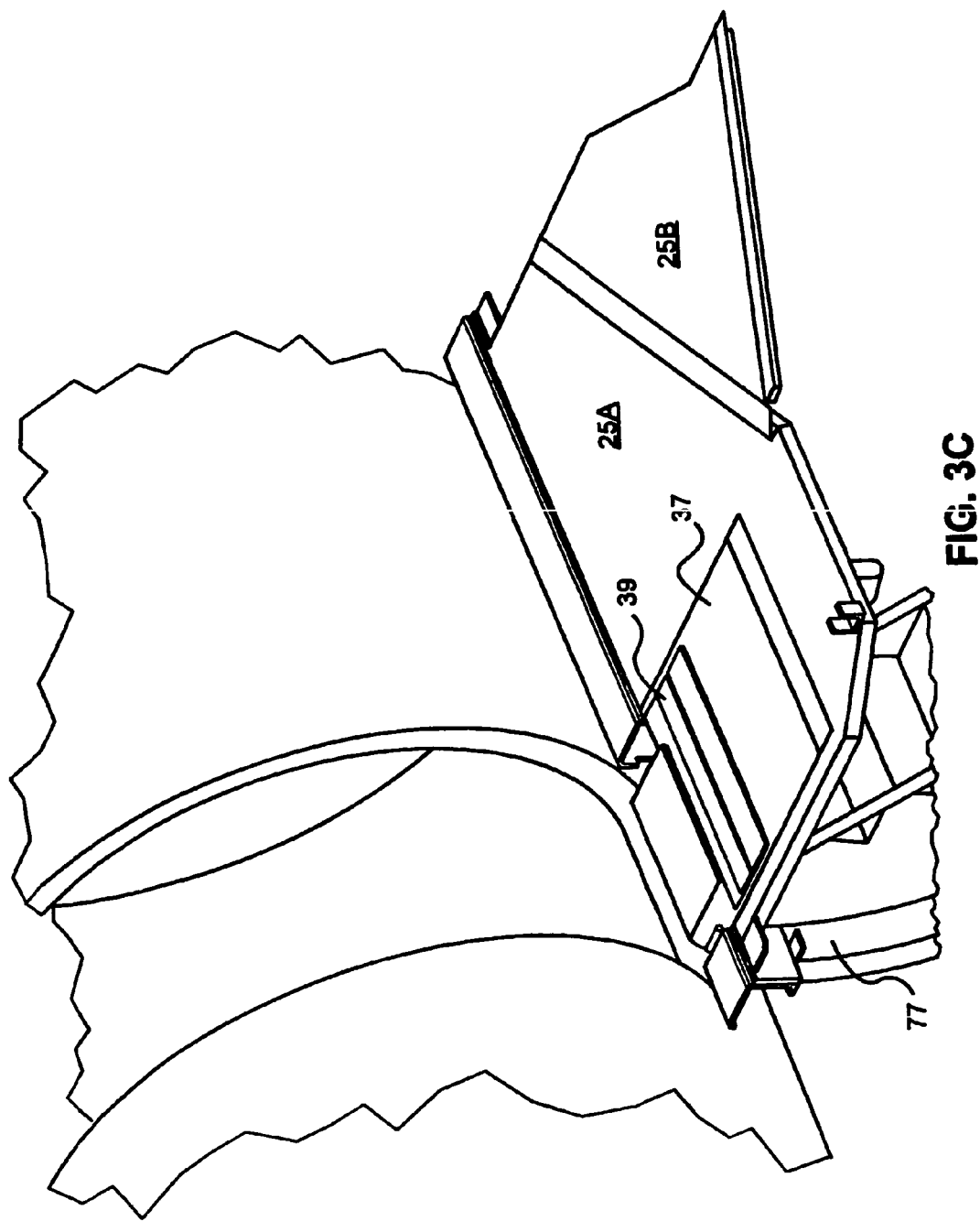

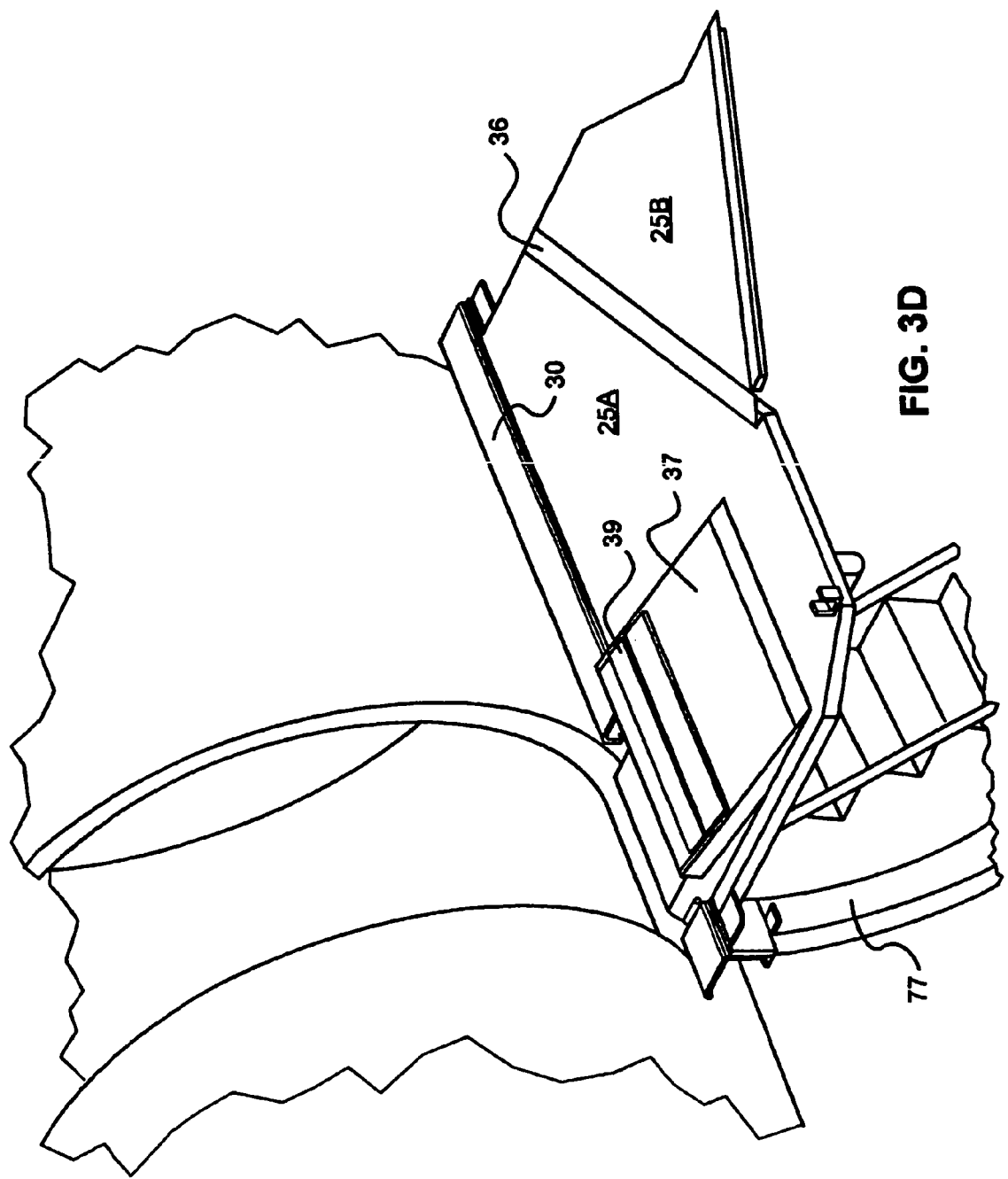

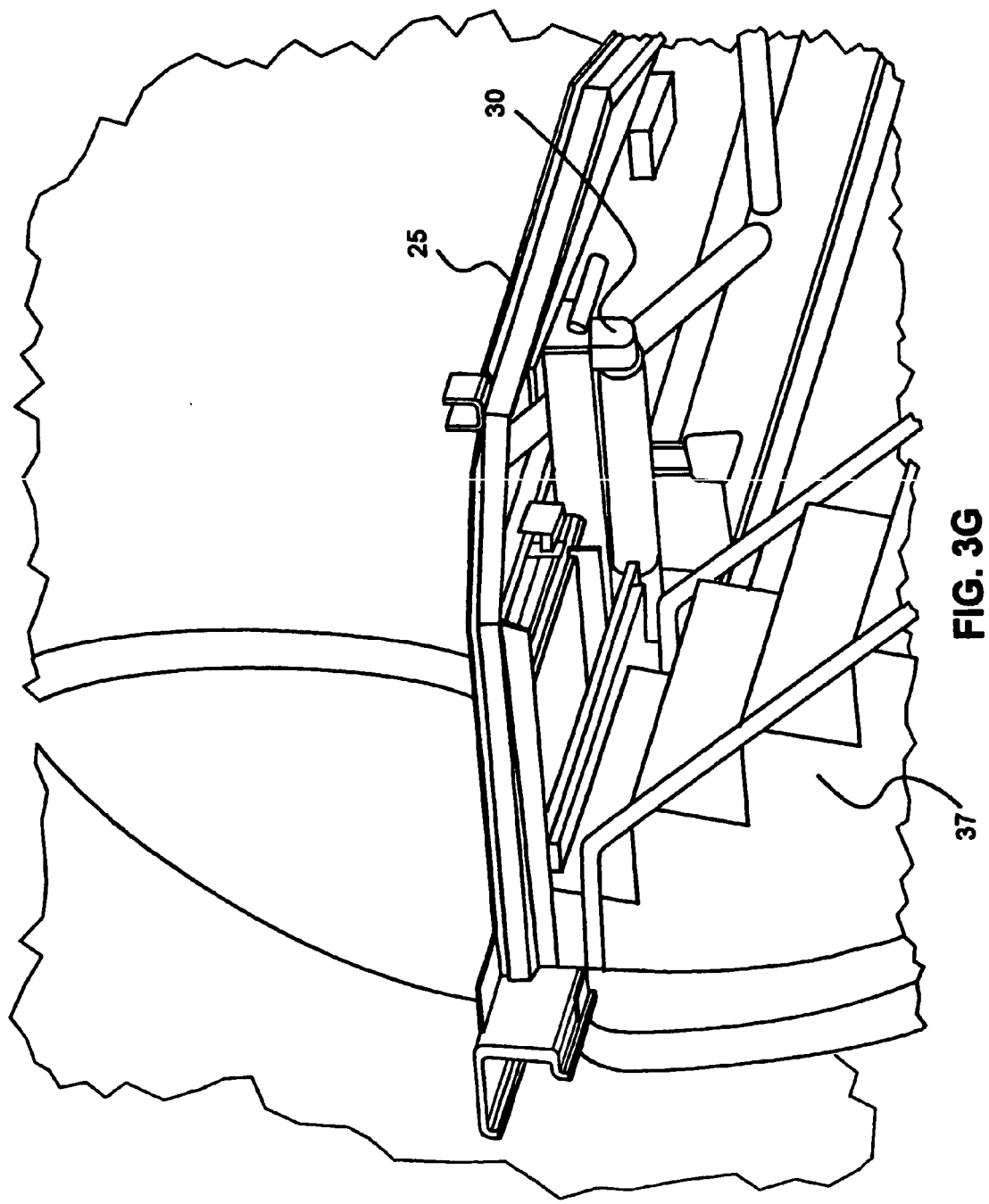

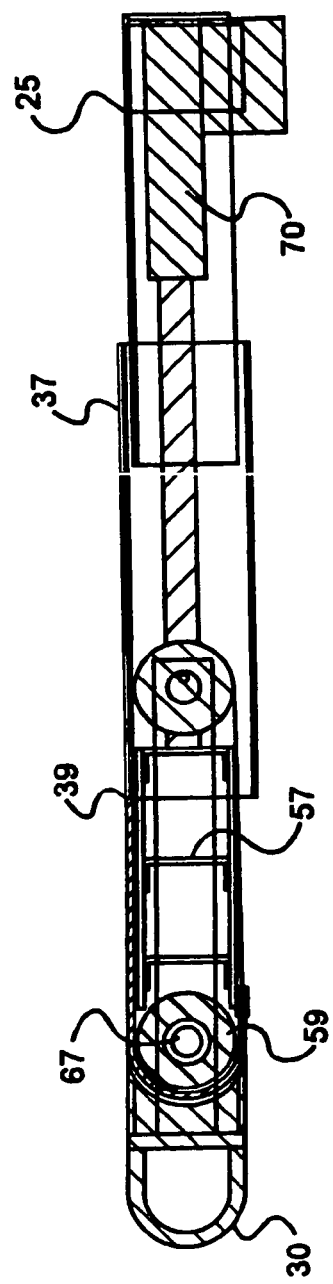
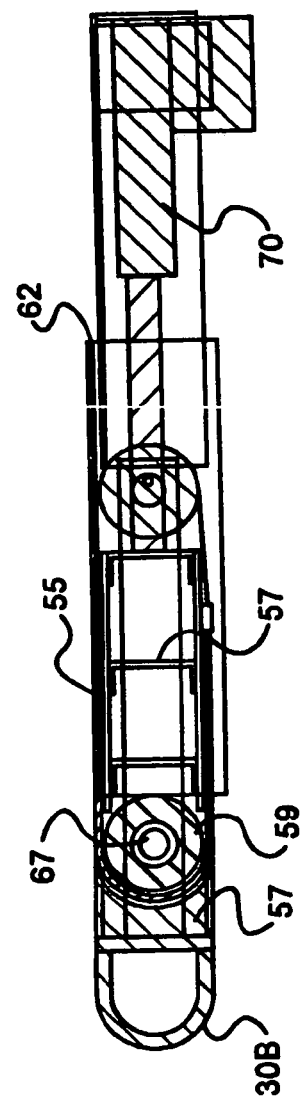
FIG. 3H
FIG. 3I

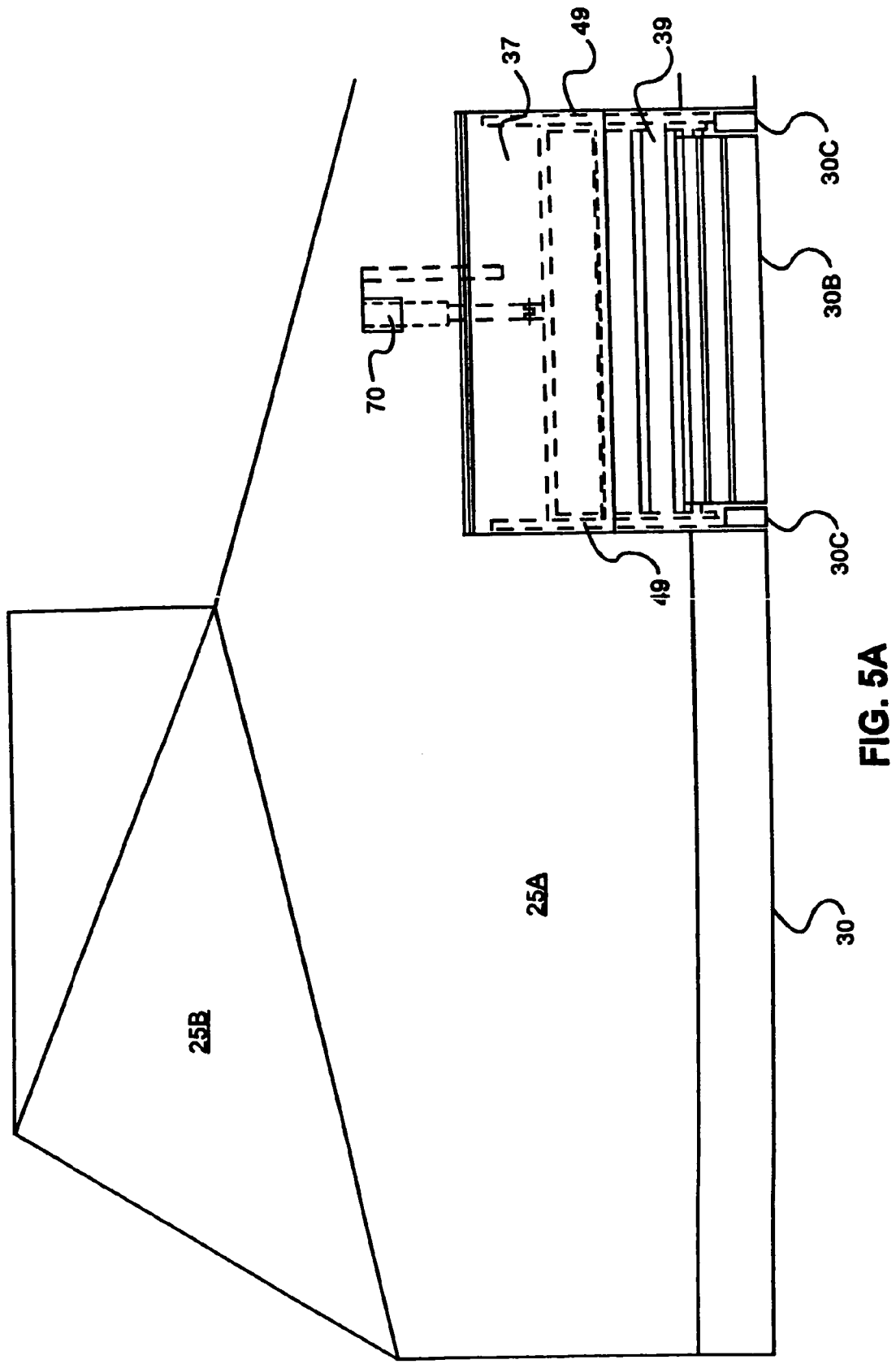

ADAPTABLE CAB FLOOR ENGAGEMENT ASSEMBLY FOR COMMUTER AND CONVENTIONAL JET AIRCRAFT

CROSS-REFERENCE TO RELATED APPLICATION

Pursuant to the provisions of 35 U.S.C. 119(e), this application claims the benefit of the filing date of provisional patent application Ser. No. 60/238,169, filed 5 Oct. 2000, for "Adaptable Cab Floor Engagement Assembly For Commuter and Conventional Jet Aircraft," which is incorporated herein by reference. Further this application is a divisional application of U.S. application Ser. No. 09/971,975 for "Adaptable Cab Floor Engagement Assembly For Commuter and Conventional Jet Aircraft" filed 4 Oct. 2001 now U.S. Pat. No. 6,898,816, which is also incorporated herein by reference.

BACKGROUND OF THE INVENTION

1. Field

This invention relates to apparatus for use in servicing aircraft at airports. More specifically, the invention is directed to aircraft boarding bridges which are adapted for permitting egress from and ingress to an aircraft positioned adjacent to an airport terminal building.

2. Statement of the Art

Aircraft boarding bridges have become a commonplace phenomena at airport terminals both in this country and abroad. Such bridges provide a passageway for aircraft passengers and crew from the terminal building to an aircraft parked proximate to the terminal building. These bridges are highly valued for their ability to shelter aircraft passengers and crew from inclement weather as well as their ability to facilitate access to the aircraft for those having special needs, such as the disabled.

A reoccurring requirement encountered at airports is the need to provide boarding bridge access to a multiplicity of aircraft types. Given the existence of a number of aircraft manufacturers, each with their own particular aircraft doorway design and the lack of a standardized configuration for the entryway of an aircraft, airport service personnel are confronted on a daily basis with the need to provide an access way to a number of aircraft doorway configurations and orientations with a single boarding bridge assembly.

A primary example of this circumstance are the requirements posed by the door configurations typically found on large commercial aircraft verses the door configurations found on smaller commuter-type aircraft. In the case of the large commercial aircraft, the door is opened by means of a lateral displacement of the door panel, e.g., the door may open by pivoting about a vertical axis. Traditional boarding bridge constructions permit the bridge to be docked against the aircraft fuselage subsequent to the opening of the aircraft door. The many commercial aircraft the door is pivoted about its vertical axis. Since the path of travel of the door is above the floor of the boarding bridge, the positioning of the boarding bridge floor against the sidewall of the aircraft does not impede the opening or closing of the aircraft door. Since the aircraft door does not come into contact with the floor structure of the boarding bridge during either the opening or closing procedure, boarding bridges have typically been constructed to define a planar floor element which is positioned elevationally below the door opening and positioned to extend outwardly from the doorway of the aircraft when the bridge is in a docked position.

In contrast, commuter aircraft oftentimes utilize a door assembly which pivots about a horizontal axis, positioned at the lower end of the door. In many instances, the door of a conventional commuter aircraft is fitted with a series of steps on its interior surface. Furthermore, the door assembly is oftentimes fitted with a handrail assembly which extends upwardly from the opposing sides of the door when the door is lowered into an open position.

In its open position the door defines a stairwell for accessing the aircraft or alternatively deplaning from the aircraft. The fact that commuter aircraft doors pivot about a horizontal axis creates a number of complications for the operator of a conventional boarding bridge structure which has been designed for use with aircraft having doors which pivot about a vertical axis. In those instances wherein a bridge is used to service a commuter aircraft, the bridge is conventionally brought into abutment against the aircraft fuselage subsequent to the opening of the aircraft door. The operator of a conventionally constructed bridge is confronted with the problem of accommodating the boarding bridge to a door having upstanding structure which is not a conventional feature of doors found on commercial aircraft. Of specific concern is the provision of a floor arrangement which provides a safe egress and ingress from the aircraft portal to the main structure of the boarding bridge.

It should be appreciated that aircraft boarding bridges seek to provide a passageway which is of considerable height above the surface of the underlying tarmac. Understandably, considerations of safety play a pivotal role in boarding bridge design. Changes in the configuration of the floor system of a boarding bridge, which are often mandated in transitioning from servicing an aircraft of one type to servicing an aircraft of a different configuration, present a significant safety concern in that adequate measures need to be taken to preclude passengers from inadvertently falling through openings in the floor system which may be created during any reconfiguration of the floor system.

It follows that there presently exists a need for an engagement structure for a boarding bridge which at once addresses the need to provide a means of accommodating varied aircraft door constructions, particularly vertically pivoted doors and horizontally pivoted doors. Some effort has been made in the past to address this issue. One such effort is disclosed in U.S. Pat. No. 6,122,789 (Stephenson et al).

Notwithstanding the efforts made in the past, a continuing need exists for an engagement structure adapted for providing a dimensionally adjustable floor system for the transition area between the aircraft and the main structure of the boarding bridge which likewise is suitable for use with both types of aircraft door structures. It is further recognized that such an engagement structure should minimize safety concerns. Such an engagement structure should provide flexibility and adaptability whereby the boarding bridge may be used to service aircraft having a variety of doorway constructions of various dimension, configuration, orientation and operation.

BRIEF SUMMARY OF THE INVENTION

An adaptable cab floor adapted for use with an aircraft boarding bridge is disclosed. The cab floor includes a frame structure which supports a generally horizontal floor surface. In a first orientation the frame structure and floor surface define an opening dimensioned to permit the passage there through of a door, or a portion of a door, of a commuter aircraft, e.g., a door which rotates about a horizontal axis. The frame structure is fitted with an assembly adapted to provide a walking surface over the aforesaid opening in a second orientation. This assembly includes at least one floor panel which is displaceable relative to the frame structure. The frame is fitted with a first floor panel which is rotatably connected to the frame structure about its proximal end. The first floor panel defines an upper surface configured to provide a walking surface for passengers exiting or entering the aircraft. This first floor panel extends outwardly from the frame structure and is oriented, in a first condition, to extend from its proximal end positioned adjacent to the frame structure to its distal end which is positioned proximate the door portal of an aircraft positioned adjacent to the cab floor assembly. In this first condition, the first floor panel extends into or over the aforesaid opening to define a bridge between the floor surface of the frame structure and the entry/exit portal of the aircraft. In a second condition, the first floor panel is rotated out of the opening defined by the floor structure sufficiently to permit the passage through the opening of the door and associated airstair assembly of a commuter aircraft.

The first floor panel defines two opposing longitudinal edges. In a preferred embodiment, the first floor panel is associated with one or more supplemental side panels. Each of these side panels may be connected to the first floor panel proximate a respective longitudinal edge of the first floor panel. Alternatively each of the side panels may be connected to the frame whereby the side panels are displaceable to an orientation wherein they provide a floor surface between the frame and the longitudinal edges of the first floor panel. In this latter construction, each of the side panels may be disposed for rotation about a horizontal axis which is mounted parallel to its respective first floor panel longitudinal edge.

In one embodiment of the invention a second floor panel is mechanically connected to the first floor panel. The second floor panel defines an upper surface configured to form a walking surface for passengers exiting or entering the aircraft. The second floor panel is constructed to be displaceable, either manually or by means of a driving structure, outwardly from the first floor panel to form a walkway from the aircraft portal to the first floor panel and thereafter to the boarding bridge structure. The second floor panel is therefore displaceable between a first condition, wherein the second floor panel is generally nested in, below or above the first floor panel and a second condition wherein the second floor panel is displaced outwardly from the first floor panel to form an extension of the floor surface formed by the first floor panel. When the second floor panel is positioned in the first or retracted condition, and the first floor panel is in a first condition, a slot-like void or recess is defined between the proximal edge of the second floor panel and the forward most portion of the floor surface of the frame structure. This slot-like void is of sufficient dimension to receive the upstanding sections of an opened door of a commuter aircraft. Once the engagement assembly is docked to the aircraft, the second floor panel is displaced to its second condition whereby the proximal end of the second floor panel is positioned into the open portal of the docked aircraft thereby forming a bridge or passageway to the main structure of the boarding bridge. The first floor panel, being pivotally secured to the frame of the boarding bridge cab, may rotate about its axis of rotation in the event that the first or second floor panels is brought into contact with any underlying structure such as portions of the opened aircraft door. This rotational capacity permits the first and second floor panels to rotate about their joint axis of rotation whereby the door panels are displaced thereby limiting or avoiding damage to either the boarding bridge or the opened aircraft door.

In a second embodiment, the second floor panel may be rotatably connected to the frame structure to rotate about a first end thereof. Similar to the second floor panel, this alternative second floor panel may define an upper surface configured to define a walking surface for passengers exiting or entering an aircraft. The side edge of this alternative second floor panel, in an extended orientation, is positionable adjacent to the portal of an aircraft parked adjacent to the cab floor assembly. In this extended orientation, the upper surface of the alternative second floor panel intercooperates with the floor surface of the first panel to form a walking surface which covers the aforesaid opening or slot. In a retracted orientation of the alternative second floor panel, a slot-like void or recess is defined between a longitudinal edge of the first floor panel and a perimeter of the frame structure. In contrast to the first embodiment, the alternative second floor panel is not mounted within or below the first floor panel. Instead, the alternative second floor panel is positioned adjacent to the first floor panel and in some constructions may actually be positioned to overlap a portion of the first floor panel.

The alternative second floor panel may be rotated by a respective driving structure or alternatively may be manually operated. The alternative second floor panel is rotatable independent of the first floor panel to permit the cab floor assembly operator to vary the configuration of the cab floor and thereby adapt the cab floor to the particular construction of the aircraft portal structure being presently serviced by the boarding bridge.

A third floor panel may also be rotatably connected to the frame structure to rotate about a proximal end thereof. Similar to the second floor panel, this third floor panel may define an upper surface configured to define a walking surface for passengers exiting or entering an aircraft positioned adjacent to the engagement assembly. The proximal end of the third floor panel, in an extended orientation, is positionable adjacent to the portal of an aircraft positioned adjacent to the cab floor assembly. In this extended orientation, the upper surface of the third panel intercooperates with the floor surface of the first panel and the upper surface of the second panel to form a walking surface which covers the aforesaid opening. In a retracted orientation of the third floor panel, a slot-like void or recess is defined between a longitudinal edge of the first floor panel and a second edge of the frame structure. This slot-like void or recess is of sufficient dimension to permit the passage therethrough of a second hand rail assembly of a commuter aircraft door assembly. In some embodiments, the third floor panel may be positioned contiguous to the upstanding wall of the cab assembly. In this latter instance, the second edge of the frame assembly is defined by the upstanding wall as opposed to the floor surface of the frame structure.

In those embodiments which include side panels interconnected to the first floor panel, these side panels may be adapted to be positionable in a somewhat upstanding orientation to form a vertical restraint or guard for the floor surface formed by the first floor panel. In this generally upstanding orientation, these side panels may be positioned proximate or in abutment with the hand rail assemblies of the commuter aircraft door to form an upstanding barrier along the edge of the floor surface defined by the first floor surface. When the first floor panel is in a first condition and the second and third floor panels are in extended orientations, the side panels are positionable to extend between the longitudinal edges of the first floor panel and the upper surface of a respective second or third floor panel to thereby form a generally planar walking surface which extends from an outermost longitudinal edge of the second floor panel to the outermost longitudinal edge of the third floor panel.

The first, second and third floor panels may be each rotated by a respective driving structure. Each of these floor panels is rotatable independent of the other floor panels to permit the cab floor assembly operator to vary the configuration of the cab floor and thereby adapt the cab floor to the particular construction of the aircraft portal structure being presently serviced by the boarding bridge.

The opening defined by the frame structure and its associated floor surface forms a passageway of sufficient dimension to accommodate the protruding platform often found on commuter type aircraft which platform forms part of the deployable airstair. A displacement, e.g., rotation, of the first floor panel to a closed orientation may be adopted to partially close the aforesaid opening passageway sufficiently to provide a passenger passageway from the aircraft to the main structure of the boarding bridge. These two floor panels may be displaced in various arrangements to provide a floor structure between the boarding bridge and the aircraft of sufficient dimension and configuration to permit the passage of passengers there over into and out of the aircraft.

Accordingly, the cab floor assembly provides the operator with a means of providing a dimensionally adjustable embarkation platform adjacent to the aircraft portal and a means of adjusting the configuration of the interface between the bridge and the fuselage of the aircraft. As may be appreciated, the cab floor assembly may be adapted to accommodate a multiplicity of aircraft door configurations, dimensions, orientations and operational characteristics on an individualized basis.

The invention therefore provides a construction whereby the floor of the boarding bridge cab may be reconfigured to define a passageway dimensioned to accommodate the platform of commuter type aircraft during its opening or closing procedure. The floor may then be reconfigured to define an embarkation platform of sufficient dimension, adjacent to the open doorway of a conventional commercial aircraft, to provide for the passage there over of passengers and crew entering or leaving the aircraft.

BRIEF DESCRIPTION OF THE SEVERAL VIEWS OF THE DRAWINGS

FIG. 3C is an elevated partial perspective view of the cab floor assembly taken from another perspective illustrating a partial extension of the second floor panel;

FIG. 3D is an elevated partial perspective view of the cab floor assembly, taken from the perspective of FIG. 3C illustrating the first and second floor panels rotated about the horizontal axis of the first floor panel;

FIG. 3G is an partial perspective view of the cab floor assembly in association with the deployable airstair of an aircraft;

FIG. 3H is a cross-sectional view of a engagement assembly of the invention shown in an extended condition;

FIG. 3I is a cross-sectional view of the engagement assembly of FIG. 3H shown in a retracted condition;

FIG. 5A is a partial perspective view of the cab floor assembly in a closed condition;

DETAILED DESCRIPTION OF THE INVENTION

Figure 1:
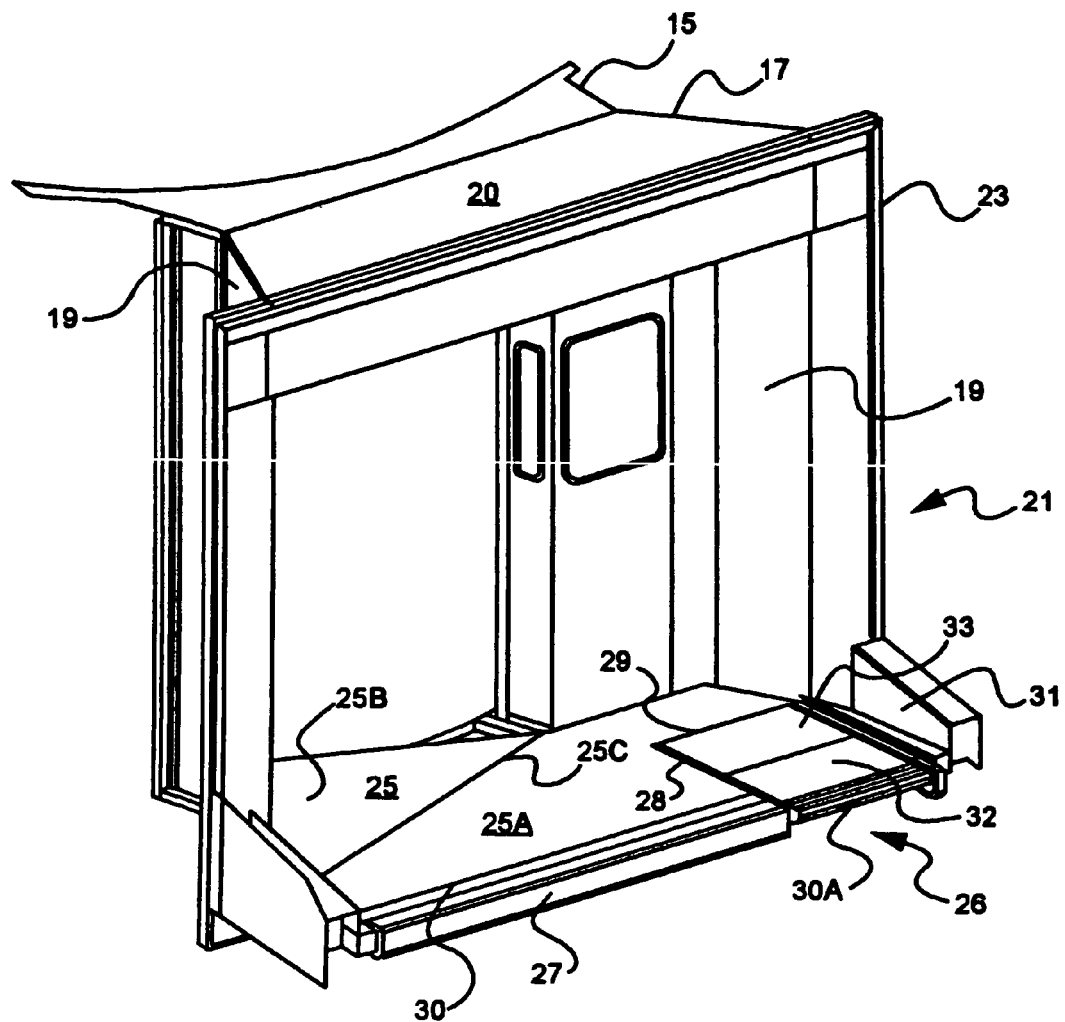
FIG. 1 is a partial elevated perspective view of a passenger boarding bridge fitted with the adaptable cab floor assembly of the instant invention. The adaptable cab floor assembly is shown in a closed condition.

As illustrated in FIG. 1, a boarding bridge 15 (shown in partial view) is fitted on its outer end with a cab 17. The cab 17 is a generally enclosed structure having a pair of opposingly positioned upstanding sidewalls 19 surmounted by a ceiling or roof element 20 which extends between the two sidewalls. The cab further includes a floor element 25. The floor element 5 extends between the two sidewalls. The cab also defines an entryway from the main boarding bridge structure. The cab 17 defines an open portal 21 which is designed to interface with the fuselage of the aircraft to be serviced by the boarding bridge. The portal 21 is defined by a framing structure 23 which extends upwardly from the floor 25 in a generally inverted U-shaped configuration. The portal frame 23 may be fitted with a canopy structure (not shown) which extends from the frame to contact the fuselage of the aircraft. A conventional accordion-like canopy is anticipated for this purpose.

The floor 25 is formed of two identifiable sections. The main body of the floor, herein designated as floor section 25A extends generally between the two upstanding sidewalls 19. A second section of the floor, designated as floor section 25B extends from the linear intersection of the two sections along the line 25C. The two sections 25A and 25B are interconnected to one another along the line 25C of their intersection to form a hinge-like connection. This hinged connection permits the two floor sections to move independent of one another to accommodate to uneven orientations of the two floor sections. The leading edge 30 of floor section 25A may be fitted with a bumper structure 27 as shown in FIG. 1. The leading edge 30 is configured to be positionable adjacent the fuselage of an aircraft to be serviced by the cab floor assembly.

The edge 30 of the forward floor section 25A defines a slot or recess opening 26 in the floor 25. This slot 26 is generally defined by the leading edge 30 of the floor section 25A, the edge 28 of the floor section 25A, the edge 29 of floor section 25A and the cab sidewall section 31. In the illustrated embodiment, this slot 26 is illustrated as a quadrilaterally configured void adjacent to the floor structure 25. It should be understood that this slot 26 may be of any number of different configurations and shapes and furthermore may be positioned at any number of locations in the floor structure proximate the leading edge 30 of the floor structure. In the instant illustration the slot is shown on the right side of the cab (as viewed from the docked aircraft). The slot 26 may also be on the left side of the cab, in the middle region of the cab or any other location along the leading edge 30 of the floor 25.

The instant invention provides a multi-segmented engagement assembly 33 which may be introduced into the aforesaid slot 26 in various configurations to form an embarkation platform over the slot 26 from an aircraft positioned adjacent to that slot 26. In those instances wherein the cab floor is directed to service a commuter type aircraft having a door assembly which rotates about a horizontal axis the boarding bridge may be brought into position with the slot 26 in an open configuration i.e., generally devoid of structure thereby permitting the passage there through of the door and associated airstair assembly of a commuter aircraft positioned adjacent to the cab floor 25. Subsequent to docking the engagement assembly may then be reconfigured to provide the desired embarcation platform from the portal of the aircraft to the boarding bridge structure. The slot 26 is specifically dimensioned to receive and permit the passage there through of the upstanding portions of an airstair structure of a commuter aircraft.

Figure 2:
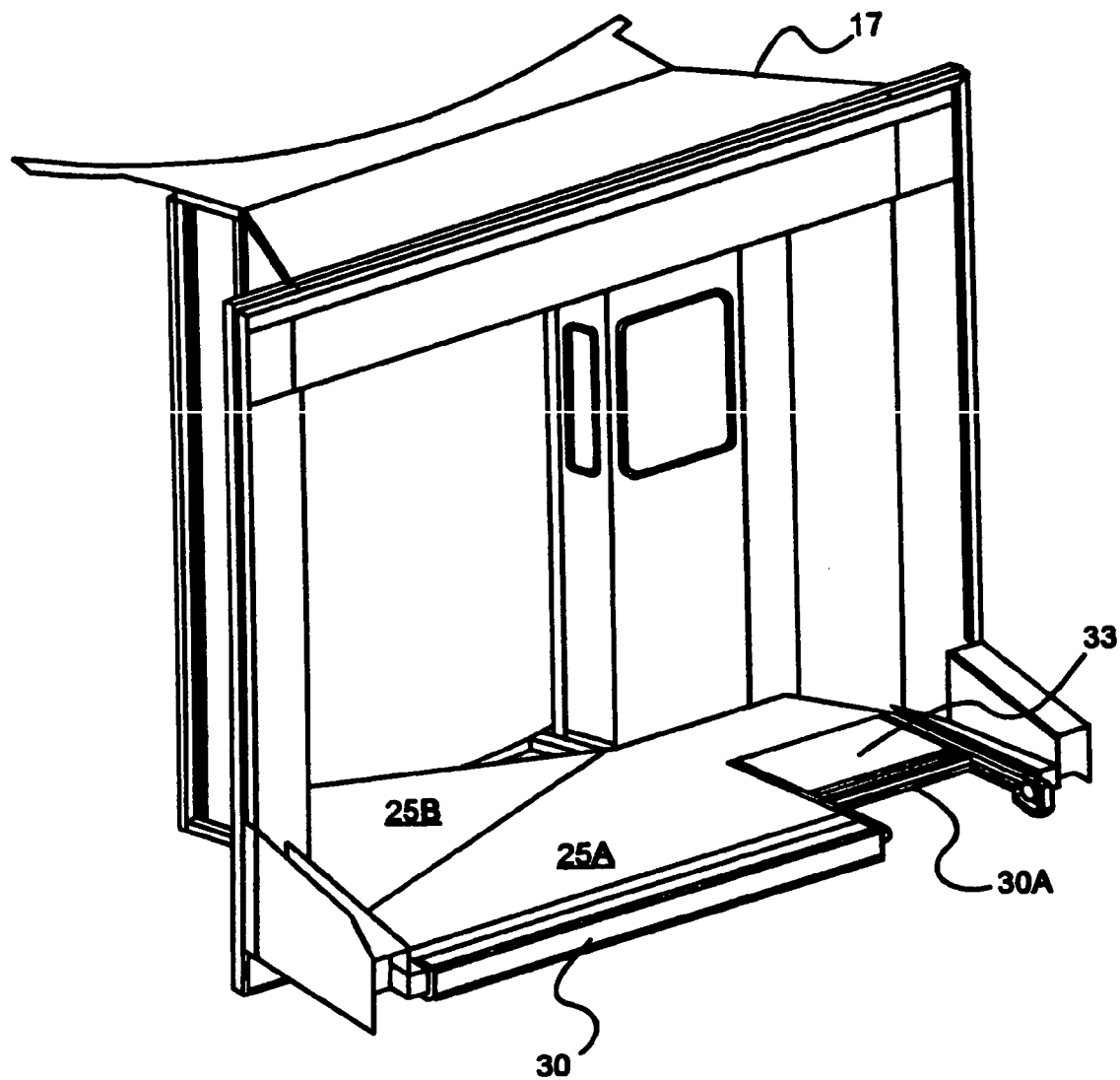
FIG. 2 is a partial elevated view of a boarding bridge illustrating a second floor panel of the cab floor assembly in a retracted condition.

During the docking procedure with a commuter aircraft, the assembly 33 is held in a retracted position until the door of the aircraft has been completely opened and secured in its open orientation. This retracted condition is shown to advantage in FIG. 2. Depending on the particular hand rail arrangement of the airstair, a segment of the assembly 33 may then be displaced into the slot 26 to interface with the aircraft door assembly and form an embarkation platform which accommodates the particular hand rail arrangement. For example as shown in FIG. 1, the assembly 33 is illustrated configured in an arrangement which provides a centrally positioned walking surface 32.

The assembly may be fitted on its outer edge with a bumper structure 30A which corresponds in construction and configuration with the bumper 30 which is fitted on the edge 30 of floor 25A.

Figure 3:
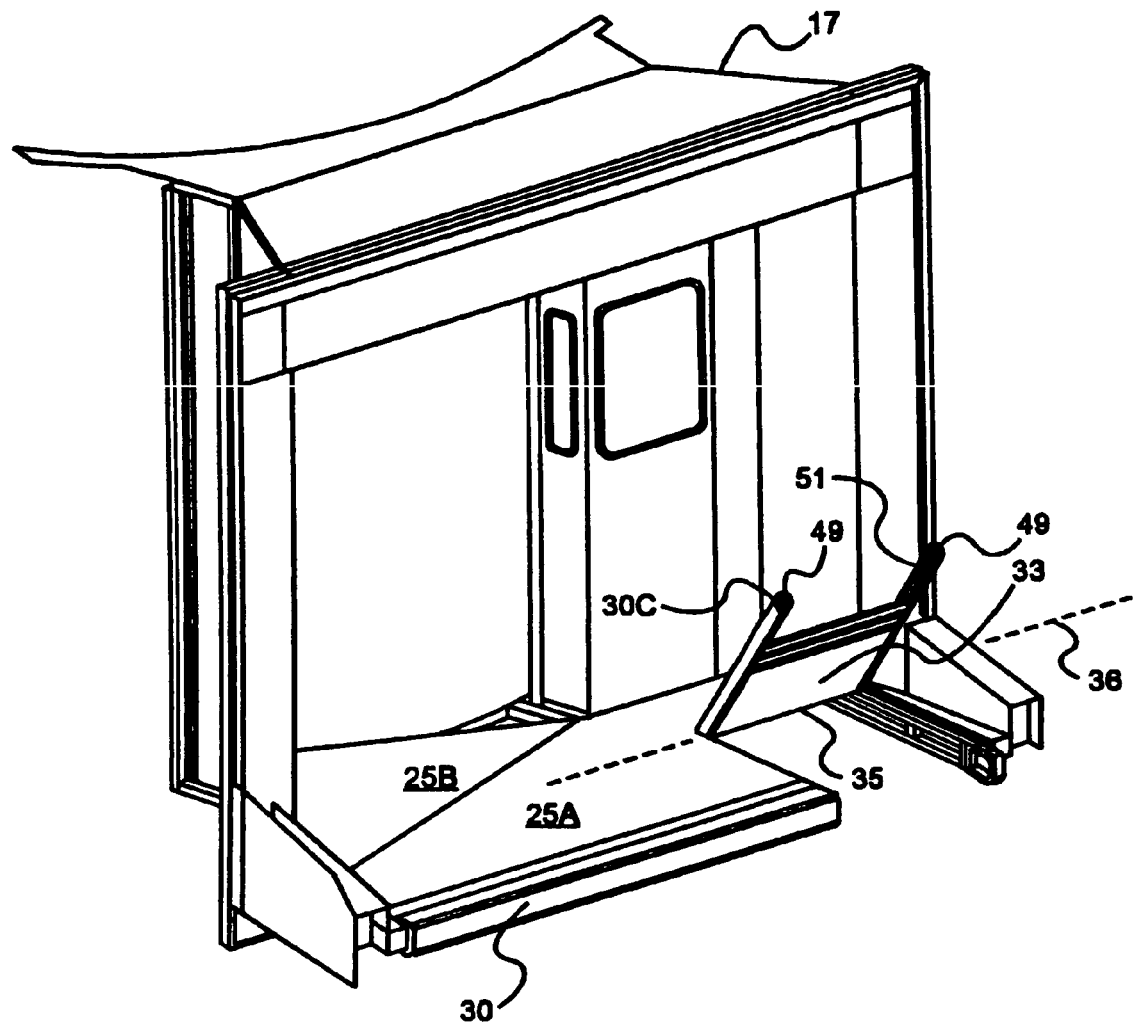
FIG. 3 is a further elevated view of a boarding bridge illustrating the first and second floor panels of an adaptable cab floor assembly in a retracted condition.

The assembly 33 is pivotally secured to the floor assembly 25 along its distal end 35 for rotation about a horizontal axis 36 as shown in FIG. 3. This pivoted mounting permits the assembly 33 to rotate upwardly in the event that the assembly should be forcedly brought into contact with any underlying structure such as the handrail assembly of an airstair. It has been found in practice that the relative positioning of an aircraft and its associated boarding bridge may change during the time that the aircraft is docked to the boarding bridge. This is especially true during the loading and unloading of the aircraft as the weight being carried by the aircraft changes due to loading or unloading. This change in weight carried by the aircraft may cause the elevation of the aircraft to be either increased or decreased depending on the amount of weight change. In the event that the elevation of the aircraft increases, i.e., the aircraft rises, the assembly 33 may be brought into a forced contact with the airstair structure as that airstair structure rises with the aircraft. The pivoted mounting of the assembly 33 permits the assembly to rotate upwardly thereby minimizing the force of the contact between the assembly and the rising airstair. The rotation therefore avoids or minimizes any damage to either the airstair or the assembly 33. A rotation of the assembly 33 is shown to advantage in FIG. 3.

FIGS. 3A–3L illustrate the multi-segmented assembly 33 in the context of the cab floor assembly. As shown, the cab floor 25 includes a frame structure 41 formed of a number of elongate frame members 43 which are positioned in spaced, relationship to one another. The frame members 43 are interconnected to one another by cross members 45 which are spacedly positioned from one another. The frame members 43 and 45 are connected to one another at their various intersections or junctures to form a frame structure having an upper surface suited for receiving and retaining the floor panel 25. The panel, which forms the floor element 25, is connected to the frame structure to define a walking surface.

Figure 3A:
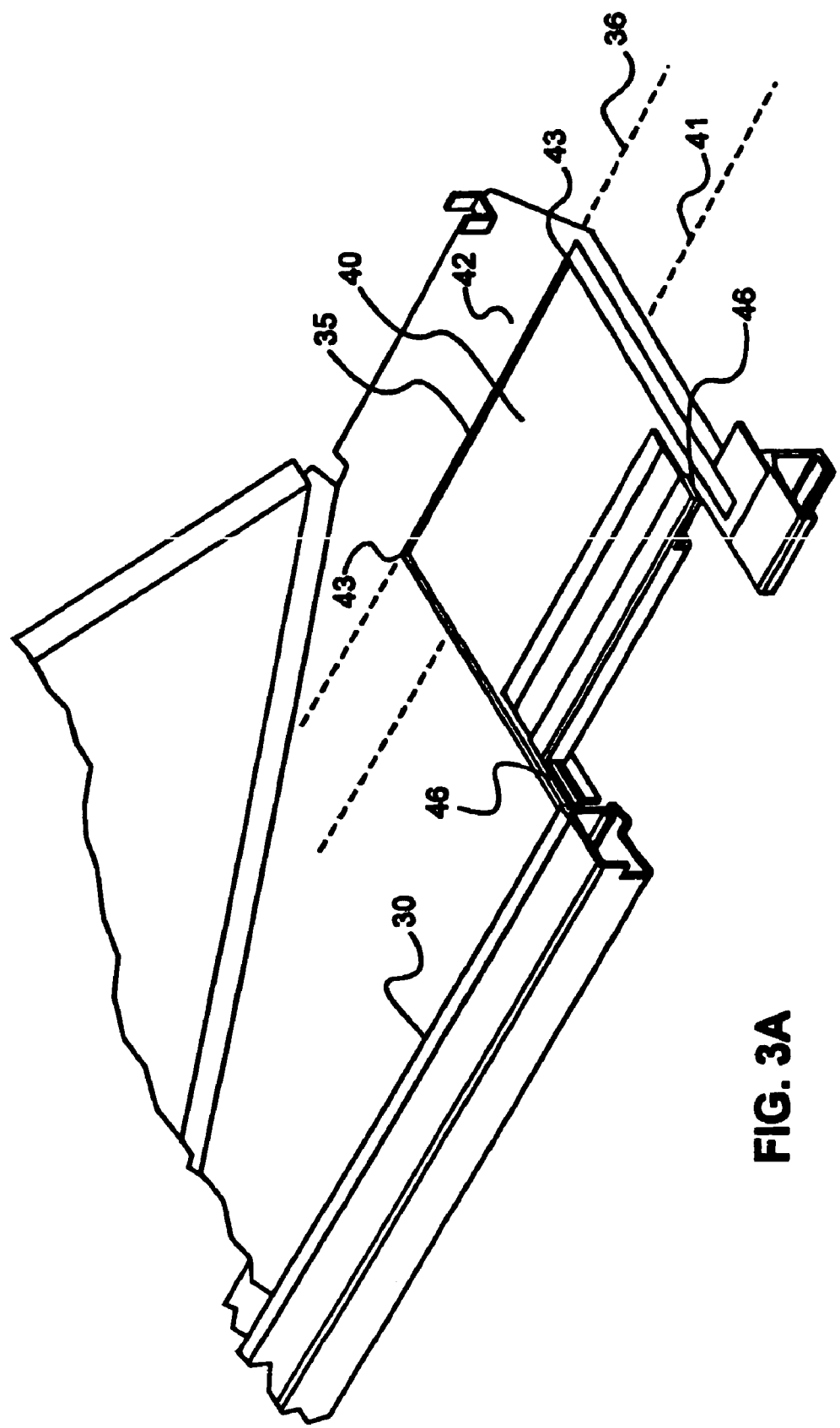
FIG. 3A is an elevated partial perspective view of the adaptable cab floor assembly with the second floor panel in a retracted condition.
Figure 3B:
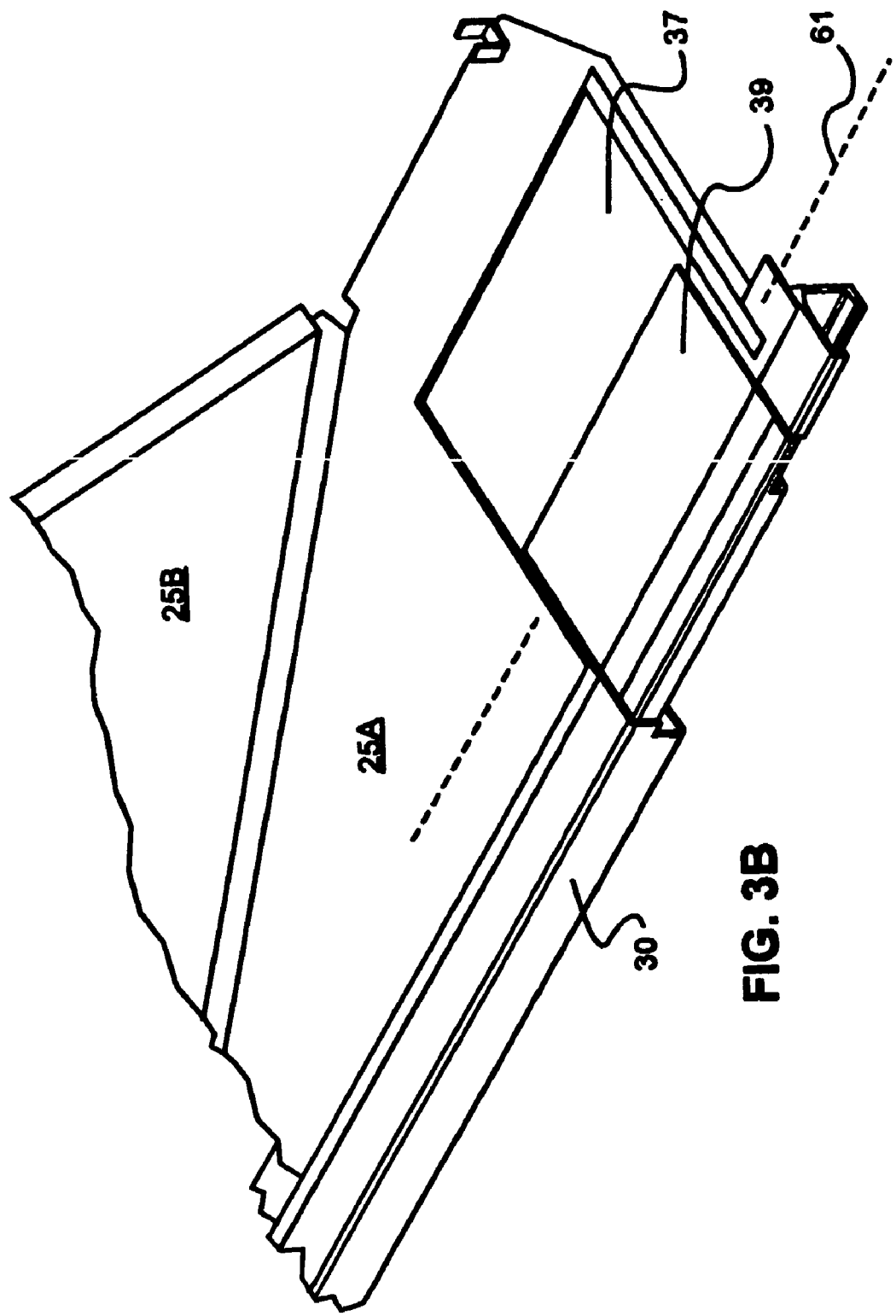
FIG. 3B is an elevated partial perspective view of the cab floor assembly illustrating the second floor panel in an extended condition.
Figure 3E:
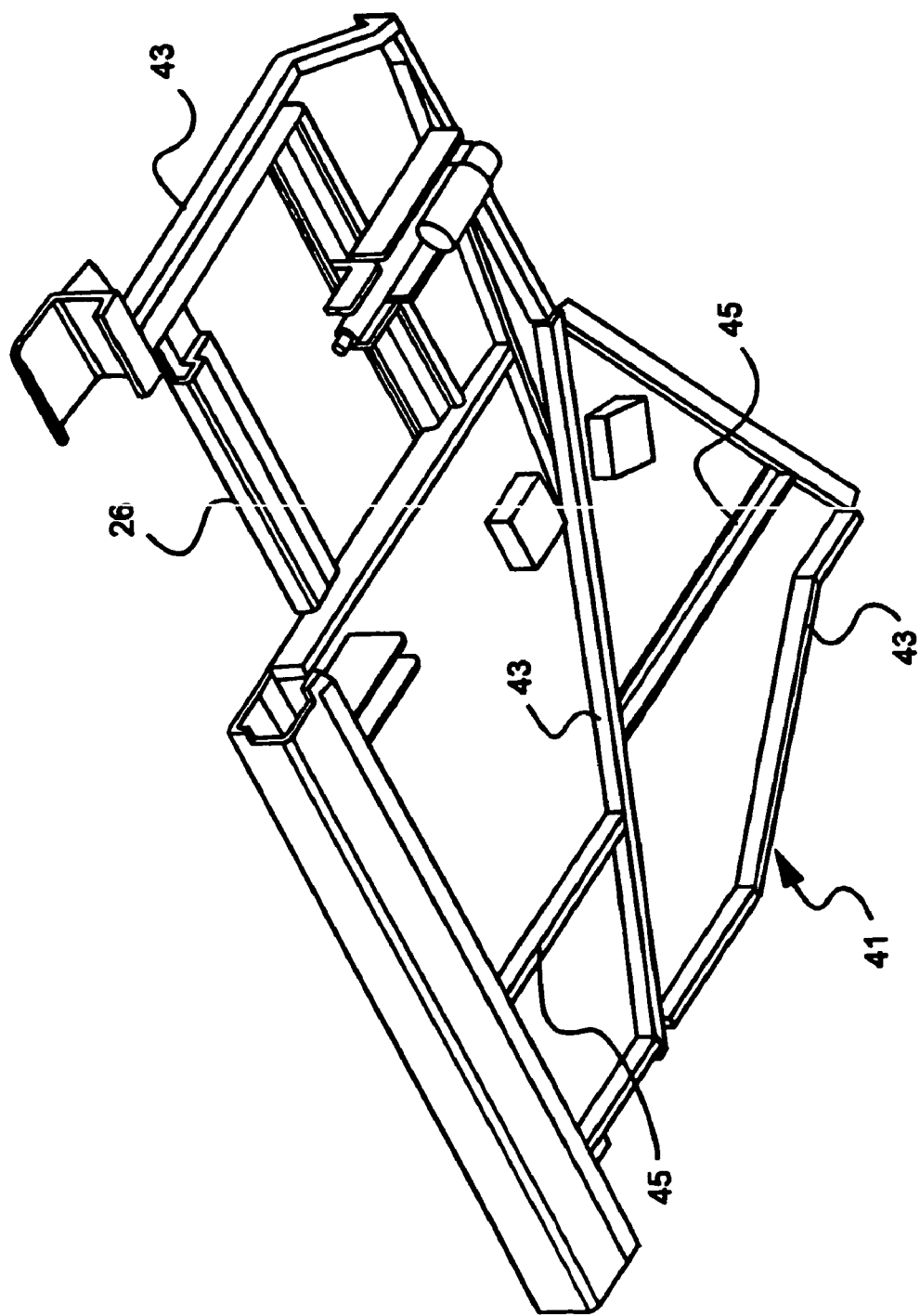
FIG. 3E is a partial perspective view of the cab floor assembly taken from below the floor assembly illustrating the second floor panel in a retracted condition.
Figure 3F:
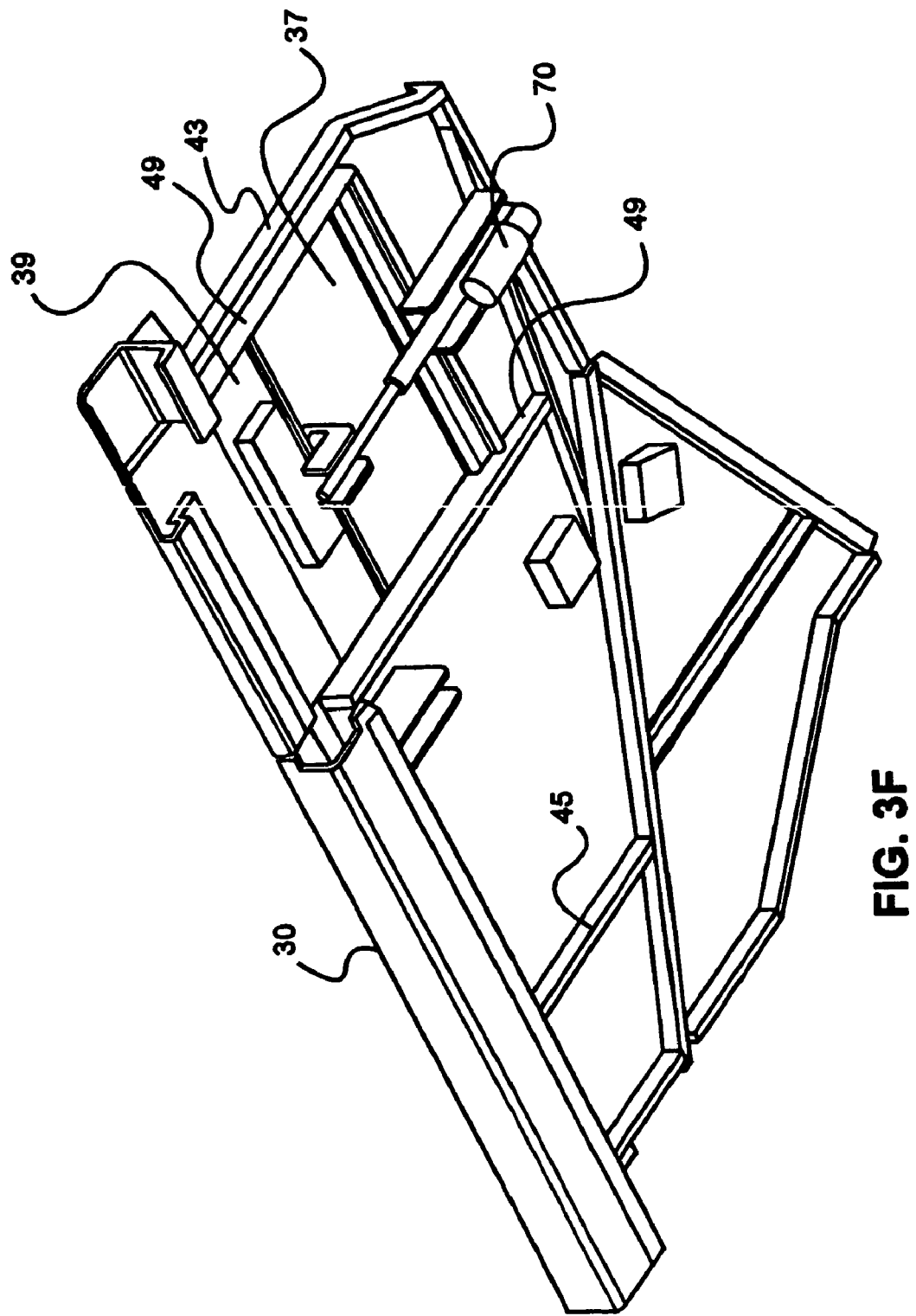
FIG. 3F is an elevated partial perspective view of the cab floor assembly, taken from the perspective of FIG. 3E illustrating the second floor panel in an extended condition.
Figure 3J:
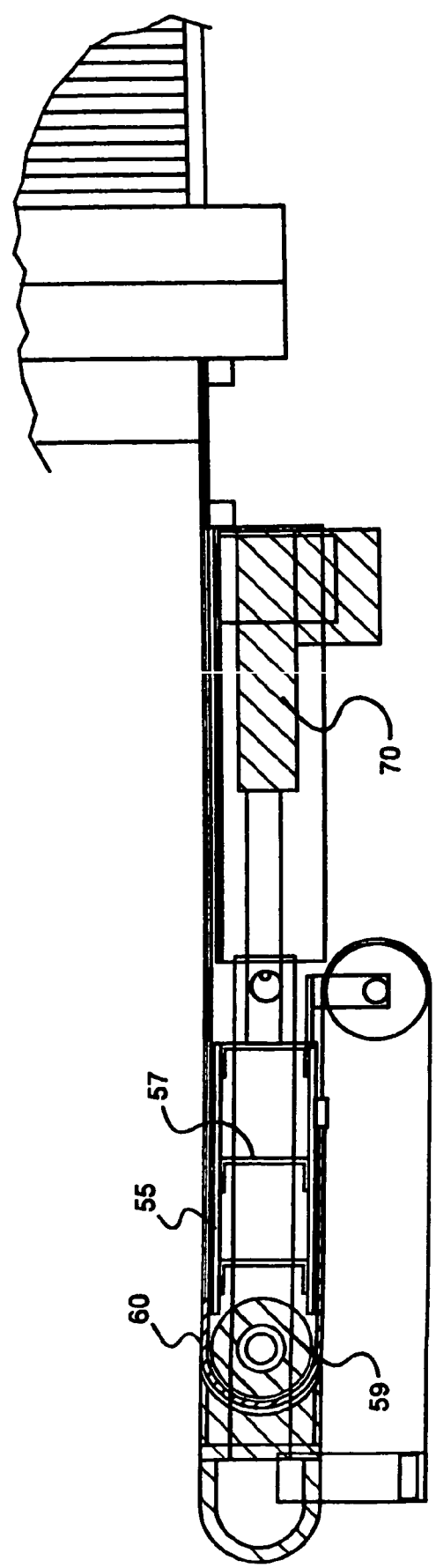
FIGS. 3J–3L are cross-sectional views of the engagement assembly of the invention illustrating a transition free intercooperation of the first and second floor panels.
Figure 3K:
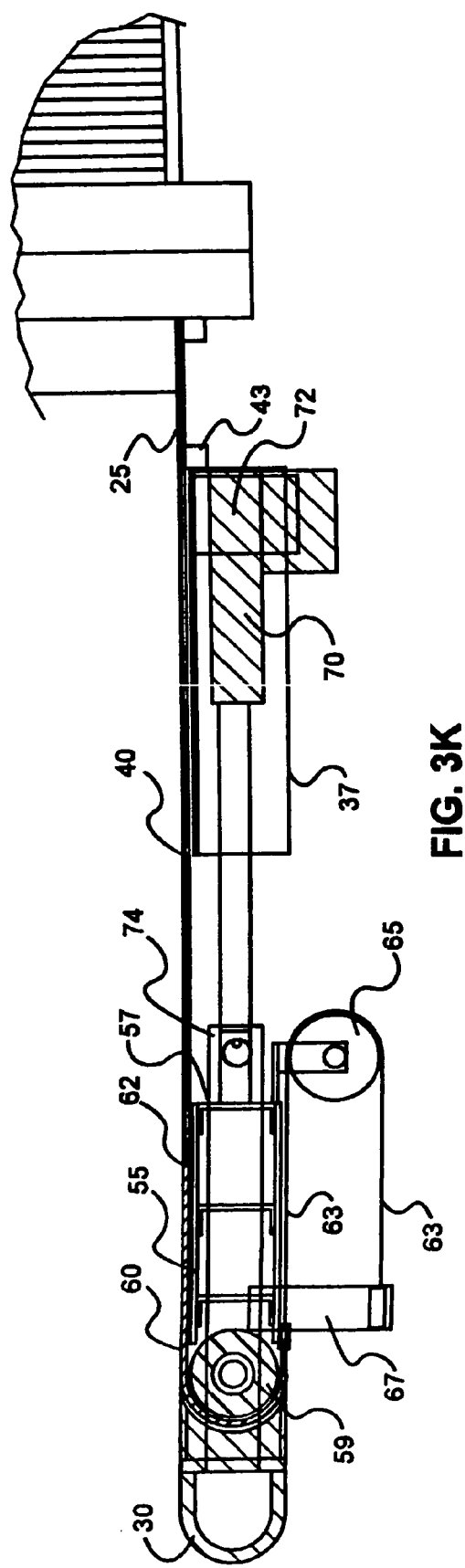

Positioned within the slot 26 defined by the floor 25 is the engagement assembly 33. This assembly 33 includes principally two floor panels, a first floor panel structure 37 and a second floor panel structure 39. As shown first floor panel structure 37 includes a generally planar walking surface panel 40 having a generally rectangular configuration in association with an underlying frame structure 38 which supports the walking surface panel 40. The longitudinal axis 42 of the panel structure 37 is oriented generally parallel to the leading edge 30 of the floor 25. The first floor panel 37 is pivotally mounted to the floor 25 by pivot mounting 43 utilizing a conventional pivot mounting structure such as a pivot axle rotatably mounted in a bracket. The pivot mounting of the first floor panel 37 permits the first floor panel 37 to rotate about the rotational axis 36. The frame 41 defines two elongate rails 46 which extend along the opposing edges 47 of the slot 26. Each of these rails defines a ledge upon which the first floor panel 37 rests when that panel is positioned in its first, closed condition as shown in FIG. 3A. The rails 46 preclude the panel 37 from rotating below the plane of the floor 25. The rails 46 therefor form a support for the first panel 37.

In a preferred construction the first floor panel structure 37 may include a pair of outwardly extending elements 49. These fork or tine-like elements are shown to advantage in FIG. 3. Each of these elements 49 are generally elongate in configuration and define a slot-like opening which extends along the length of each element to form a channel 51. In this construction the free end of each element 49 is fitted with a bumper structure 30C which corresponds in construction and material to the bumper 30 discussed above.

The second floor panel structure 39 defines a generally planar upper surface 52 which forms a walking surface for passengers exiting the aircraft. The second panel structure 39 has a longitudinal dimension which corresponds generally with the length of the first panel structure 37. The second panel structure 39 may be configured in various constructions. In a first construction, the second panel structure 39 may be generally planar in construction and be positioned with its side edges disposed within the channel 51 defined within the elements 49 to be slidable therein between a retracted condition wherein the panel structure 39 is largely positioned beneath or within the first panel structure 37 in a stored condition and a second extended condition, shown in FIG. 3B wherein the panel has been displaced outwardly from the first panel along the channels 51 so as to abut against the fuselage of the aircraft being serviced. The underlying frame 38 of the first panel structure is adapted in those constructions wherein the second panel structure is nested or stored within the body of the first panel structure. In this latter embodiment, the frame 38 is adapted to include a pair of opposingly positioned channel defining structures mounted within the frame 38. Each channel defining structure defines a channel which interconnects with the channel 51 of a respective element 49 to form an extension of that channel within the body of the frame 38.

This orientation of the second panel structure 39 is shown in greater detail in FIGS. 3H through 3L. As shown therein, the second panel structure 39 includes a planar surface panel 55 which is secured to an underlying frame 57. The frame 57 includes a roller member 59 on each of the sides of the frame. Alternatively, a single roller which extends over the complete width of the panel structure 39 may be used. The roller or rollers are preferably rotatably mounted to the panel structure 39. Each roller member 59 is positioned with its longitudinal axis oriented parallel to the longitudinal axis 61 of the panel 39.

Trained about the roller 59 is a flexible band of material 60 which is disposed over the surface 55. The first end 62 of the band 60 is fixedly secured to the panel structure 37 at location 62. The band 60 is dimensioned to have a width which is substantially dimensionally identical to the width of the second panel structure 39. The opposing end of the band 60 is fitted with two cables. Each cable 63 is secured to the band 60 proximate a respective side of the band 60. Each cable 63 is trained over a pulley 65 which is mounted, preferably rotatably, to the second panel structure 39. The cable 63 is secured at its end to a bracket 67 which is attached to a respective element 49. As shown in FIGS. 3H through 3L as the second floor panel is displaced between a retracted condition (FIG. 3J) and an extended condition (FIG. 3K), the band is displaced along the underside of the panel structure 39 and subsequently around the roller 59 eventually being positioned over the surface 55 to form a transition free walking surface for the engagement assembly. The thickness of the band 60 is dimensioned thickness-wise such that when the two panel structures 37 and 39 are positioned adjacent to one another and the band 60 is drawn over the surface of the second floor panel, the plane of the upper surface of the band 60 is generally co-planar with the upper surface of the upper surface of panel 40 of the first panel structure. This dimensioning of the band produces a substantially planar or transition-free surface between the first and second panel structures 37 and 39. In this particular construction the axle 67 of the roller 59 may be secured within the channels 51 of the two elements 49. In this particular construction the first panel 37 may include an underlying framework structure which defines a void dimensioned to receive and retain the second panel structure 39, including the pulleys 65, in a nested orientation when that panel is in a retracted condition.

Figure 3L:
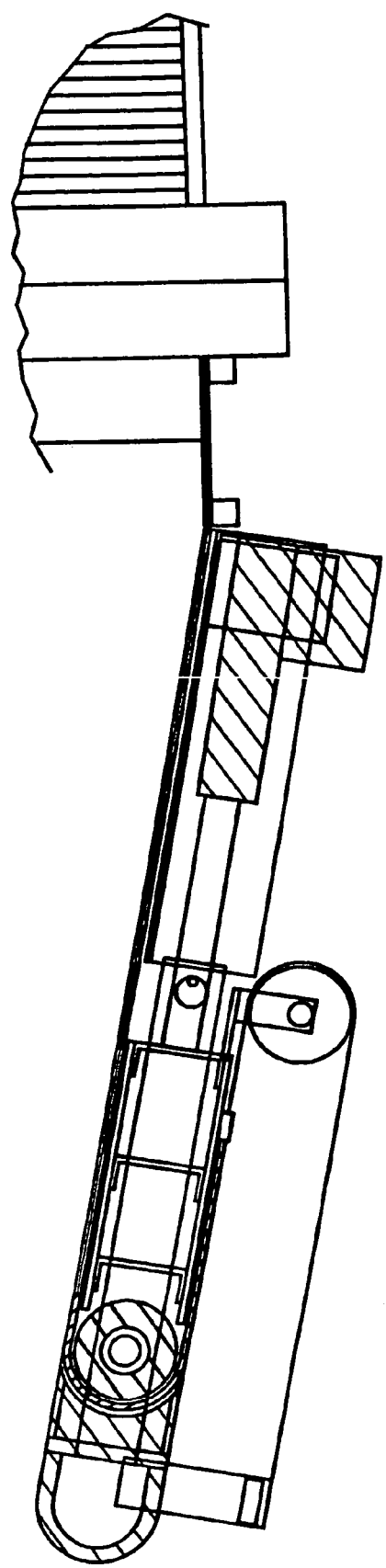

Various power structures 70 are contemplated, including electric motors and adjustors as well as hydraulic powered rams for displacing the second floor panel 39. As shown in FIGS. 3H and 3I, a hydraulic ram is shown attached to the underside of the first floor panel 37. This ram 70, being mounted to the first floor panel 37 is rotatable with the assembly 33 as shown in FIG. 3L. The head of the ram 74 is shown in attached engagement with the second panel structure 39. As the ram is actuated and driven outwardly from its piston 72 the second floor panel structure 39 is driven along the channels 51 and the band 60 slides along the underside of the second panel and is extended over the upper surface of panel 55. Similarly as the ram is retracted into its cylinder the second panel structure 39 is driven back into a nested orientation in the first panel 37.

Figure 4:
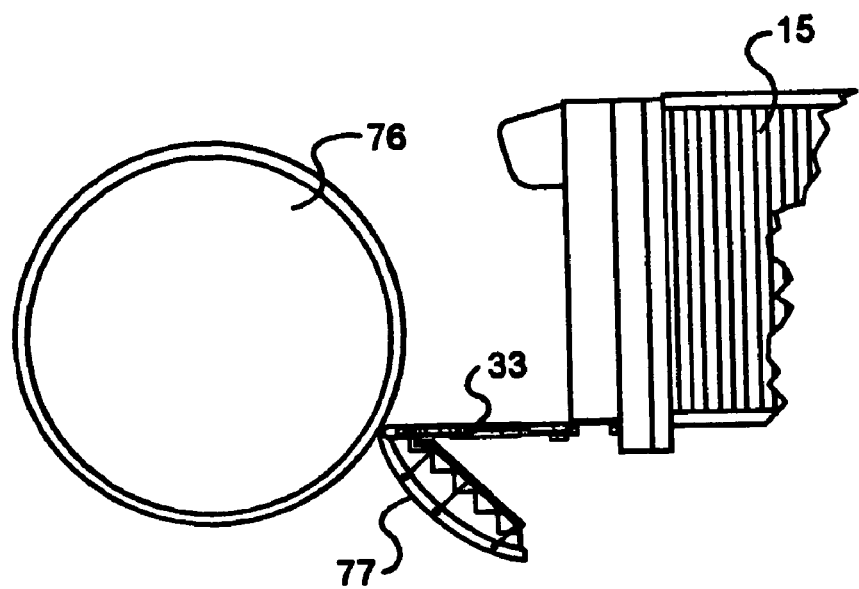
FIG. 4 is a cross-sectional side view of an aircraft in association with a boarding bridge of the instant invention shown in a conventional passenger unloading orientation.
Figure 5:
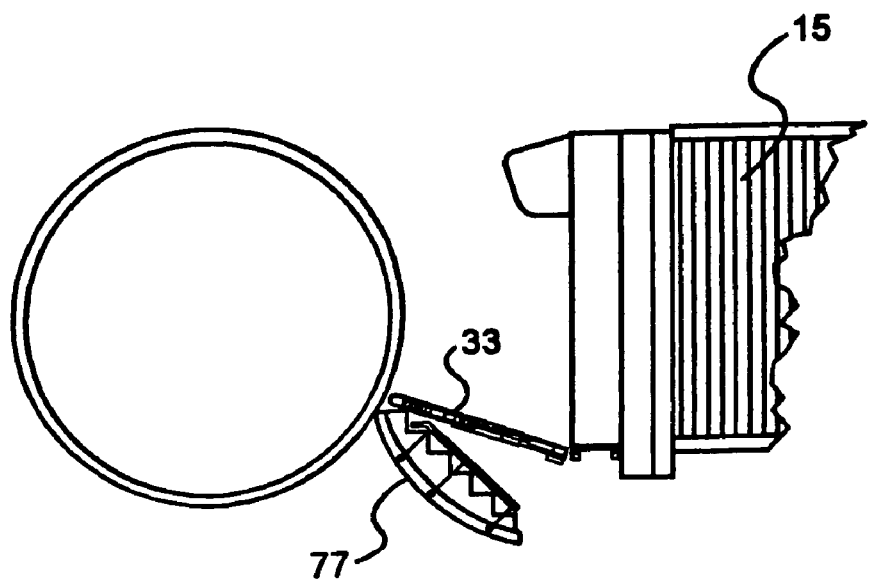
FIG. 5 is a cross-sectional side view of the aircraft and boarding bridge association of FIG. 4 wherein the relative positioning of the aircraft and the boarding bridge has shifted thereby causing a rotation of the first and second floor panel boarding bridge engagement assembly as that assembly contacted the upstanding structure of the airstair.

FIGS. 4 and 5 illustrate the function of the pivoted mounting of the first panel structure 37 to the floor 25. FIG. 4 illustrates the positioning of the engagement assembly during a normal unloading docked condition. Notably, the first and second panels 37 and 39 are shown in a generally horizontal orientation. The engagement assembly is shown above and generally out of contact with the airstair 77. FIG.

5 illustrates a condition wherein the elevation of the aircraft has changed, i.e., the aircraft has been elevated by the action of its suspension system due to the unloading of passengers, i.e., the weight of the departing passengers has been removed from the suspension system thereby permitting that system to return the aircraft to an unloaded raised or increased elevation. In this latter orientation, the airstair 77 is elevated together with the elevating aircraft thereby bringing the airstair into contact with the engagement assembly 33. Due to the pivoted mounting of the first panel 37, the entire engagement assembly 33 is permitted to be rotated as it engages the airstair thereby lessening the resistance of the engagement assembly against the airstair. The engagement structure 33 therefore rotates about the axis 36 thereby lessening if not eliminating the likelihood of either the engagement assembly 33 or the airstair 77 being damaged by their contact. In preferred constructions, the engagement assembly 33 is fitted with sensors to sense a predetermined change in the incline of the assembly 33. Upon the predetermined incline setting being exceeded the sensor sends a signal to a display or alternatively activates an alarm to advise the operator of the orientation of the engagement assembly 33 and the need to take remedial action.

FIGS. 6–9 illustrate an alternative construction of the engagement assembly wherein the second panel structure 39 of the prior described construction is replaced by a second panel structure 80 which is pivotally mounted to the floor 25 to be rotatable about a generally horizontal axis 81. As shown the second panel 80 is a generally planar panel having a generally rectangular configuration. The panel is pivotally secured to the floor 25 by a pivot mounting structure 83. The second panel 80 may be rotated about axis 81 to the retracted condition shown in FIG. 8 whereby the upper surface of the panel is brought to rest atop the upper surface of the floor 25 thereby exposing a portion of the slot 26. It is contemplated that the second panel 80 may be either manually displaceable between its retracted and extended conditions or alternatively the panel 80 may be displaced between the two conditions by a power driven device such as an electric or hydraulic motor. In either case the first panel 37 is substantially similar to the first panel described above with the exception that elements 49 are no longer used. In other constructions the second panel 80 may be substantially a planar panel without an underlying support structure.

Figure 6:
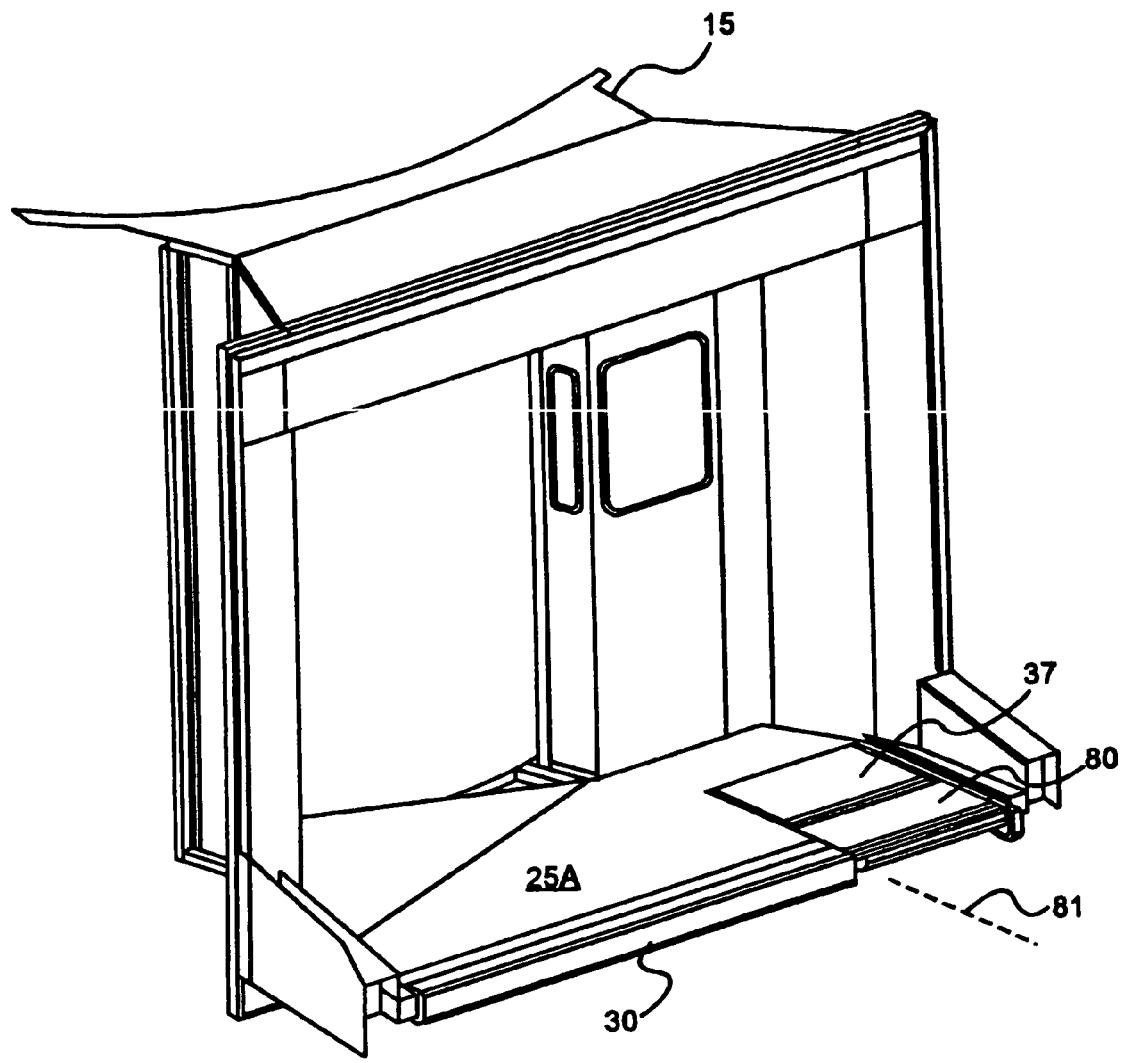
FIG. 6 is a partial elevated perspective view of a passenger boarding bridge fitted with an alternative construction of the adaptable cab floor assembly of the instant invention. The adaptable cab floor assembly is shown in a closed condition.

In this alternative construction of the engagement assembly, the ledges 46 formed by the frame of the floor 25 function to retain the second panel 80 in a generally horizontal orientation when the second panel is in the extended condition shown in FIG. 6.

Figure 7:
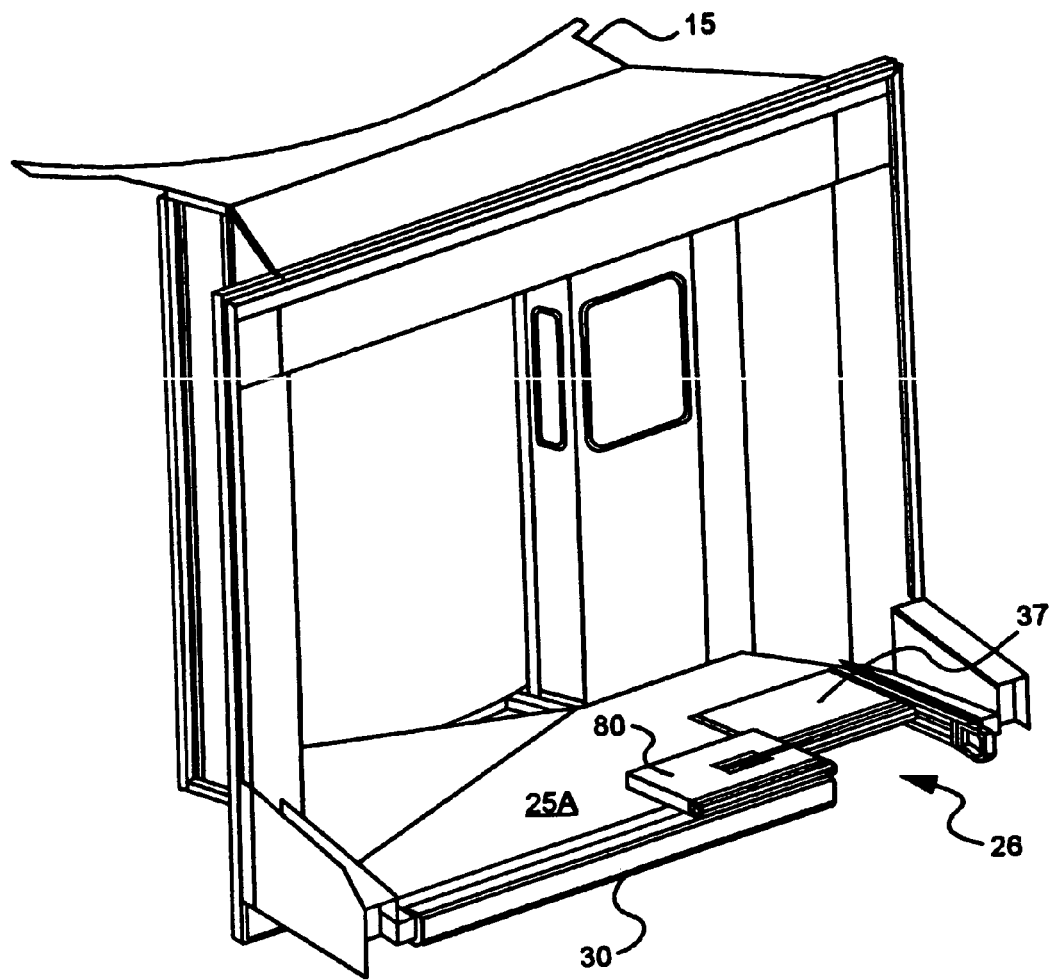
FIG. 7 is a partial elevated view of a boarding bridge illustrating a second floor panel of the cab floor assembly in a retracted condition.
Figure 8:
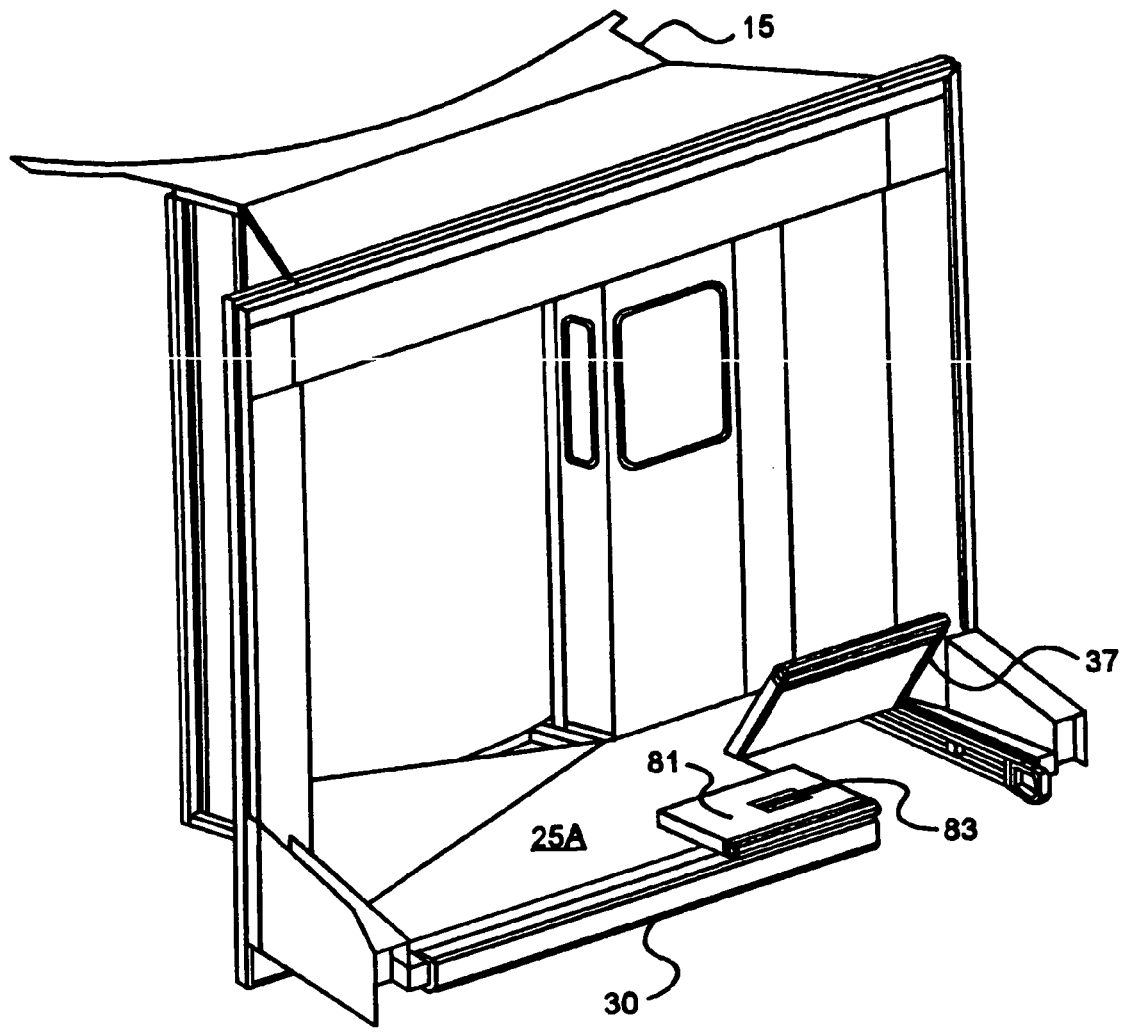
FIG. 8 is a further elevated view of a boarding bridge illustrating the first and second floor panels of an adaptable cab floor assembly in a retracted condition.
Figure 9:
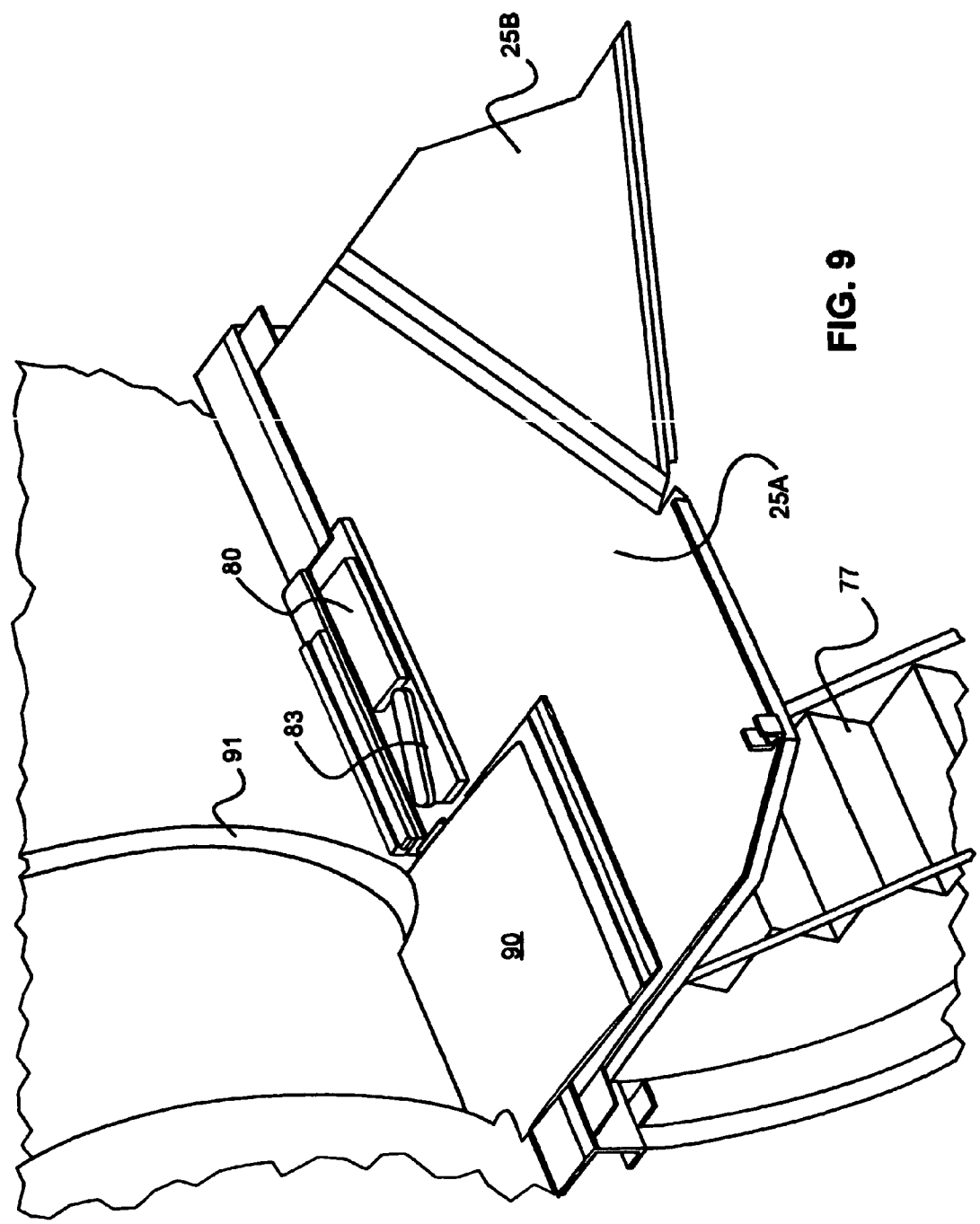
FIG. 9A is an elevated partial perspective view of the adaptable cab floor assembly with a cover plate shown positioned atop the boarding bridge engagement assembly.

FIGS. 6–9 illustrate the displacement of the assembly 33 from the fully retracted position shown in FIG. 7 to the extended condition of FIG. 6, the condition being dictated by the nature of the entry portal of the aircraft to be serviced. In the orientation illustrated in FIG. 7, the assembly 29 is fully retracted thereby exposing a portion of the slot 26. In this orientation, the operator may position the cab floor proximate the door of a commuter aircraft having a door which rotates about a horizontal axis. With the aircraft door in an open position the cab floor may be positioned proximate the aircraft. Should the aircraft door having any upstanding structure associated therewith, the slot 26 is dimensioned to permit the passage there through of such structure. After the boarding bridge has been docked with the aircraft with the second panel 80 in the position shown in FIG. 9, a generally planar panel 90 is positioned over the slot 26 to form a passageway over the slot 26 and the aircraft door. The panel 90 is dimensioned to extend from a location within the aircraft to the first panel structure 37. As shown in FIG. 9, the panel 90 extends from a location several inches into the aircraft door 91 to a location proximate the pivoted mounting of the first floor panel 37 to the floor 25.

Figure 10:
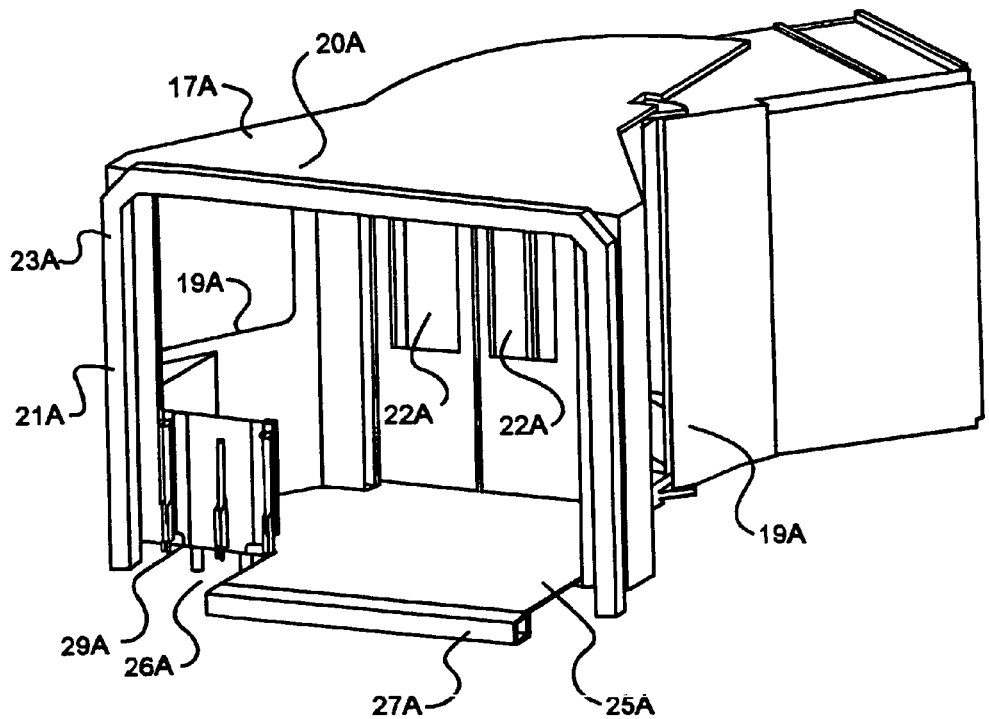
FIG. 10 is a partial elevated perspective view of a passenger boarding bridge fitted with the adaptable cab floor assembly of the instant invention. The adaptable cab floor assembly is shown in a retracted condition.

A second embodiment of the invention is illustrated in FIG. 10. As illustrated in FIG. 10, a boarding bridge 15A (shown in partial view) is fitted on its outer end with a cab 17A. The cab 17A is a generally enclosed structure having a pair of opposingly positioned upstanding sidewalls 19A surmounted by a ceiling or roof element 20A which extends between the two sidewalls. The cab further includes a floor element 25A, which is generally planar in configuration. The floor element 25A extends between the two sidewalls. The cab also defines an entryway from the main boarding bridge structure. In the illustrated embodiment, the entryway is fitted with a pair of doors 22A. Opposite from the doors 22A is an open portal 21A which is designed to interface with the fuselage of the aircraft to be serviced by the boarding bridge. The portal 21A is defined by a framing structure 23A which extends upwardly from the floor 25A in a generally inverted U-shaped configuration. The portal frame 23A may be fitted with a canopy structure (not shown) which extends from the frame to contact the fuselage of the aircraft. A conventional accordion-like canopy is anticipated for this purpose.

The floor 25A is formed of two identifiable sections. The main body of the floor, herein designated as floor section 25AA extends generally between the two upstanding sidewalls 19A. A forward extending section of the floor, designated as floor section 25AB extends forward of an imaginary line 32A which interconnects the most forward portion of each of the two sidewalls 19A. As illustrated, the forward section 25AB is a generally rectangularly configured planer panel having parallel side edges 28A and a linearly configured leading edge 30A which is oriented orthogonally to the side edges 28A. The leading edge 30A may be fitted with a bumper structure 27A as shown in FIG. 1. The leading edge 30A is configured to be positionable adjacent the fuselage of an aircraft to be serviced by the cab floor assembly.

The edge 28AA of the forward floor section 25AB in conjunction with the leading edge 32A of the floor section 25A defines a slot or recess opening 26A in the floor 25A. This slot 26A is generally defined by the leading edge 32A of the floor section 25AA, the edge 28AA of the floor section 25AB, the imaginary line 34AB and the imaginary line 34AA. In the illustrated embodiment, this slot 26A is visualized as a quadrilaterally configured void adjacent to the floor structure 25A.

Figure 12:
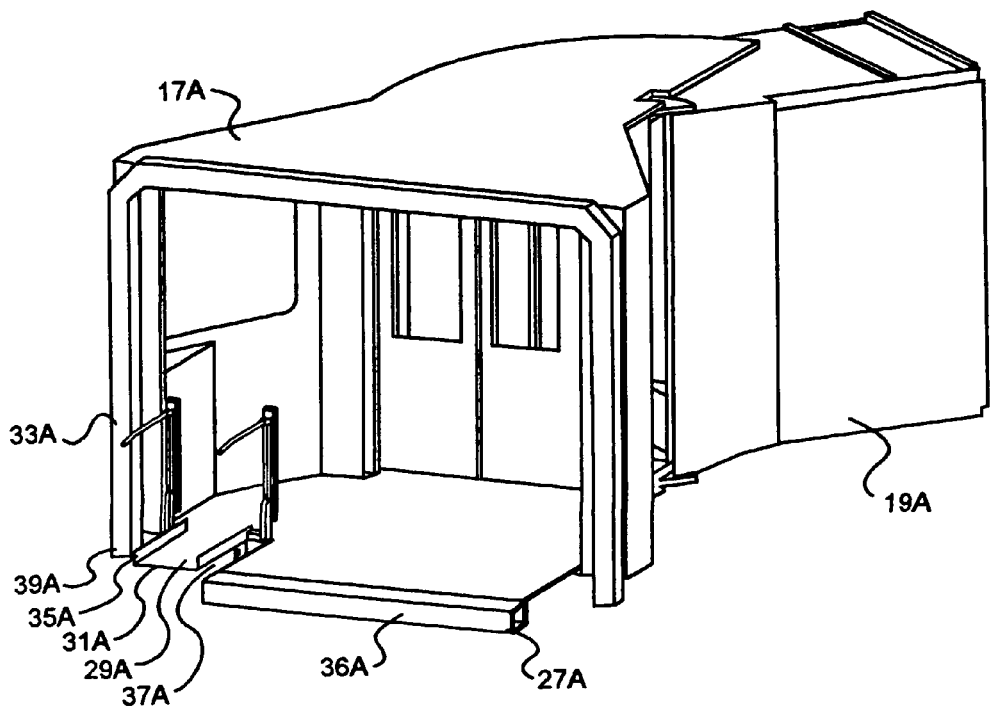
FIG. 12 is a partial elevated view of a boarding bridge illustrating a first floor panel of the cab floor assembly in an extended condition.

The instant invention provides a multi-segmented assembly 29A which may be introduced into the aforesaid slot 26A in various configurations to form an embarkation platform from an aircraft positioned adjacent to that slot 26A. In those instances wherein the cab floor is directed to service a commuter type aircraft having a door assembly which rotates about a horizontal axis the slot 26A is left generally devoid of structure thereby permitting the passage therethrough of the door and associated airstair assembly of a commuter aircraft positioned adjacent to the cab floor 25A. Stated otherwise, the assembly 29A is held in a retracted position until the door of the aircraft has been completely opened and secured in its open orientation. Depending on the particular hand rail arrangement of the airstair, one or more segments of the assembly 29A may then be displaced into the slot to interface with the aircraft door assembly and form an embarkation platform which receives and accommodates the particular hand rail arrangement. For example as shown in FIG. 12, the assembly 29A is illustrated configured in an arrangement which provides a centrally positioned walking surface 31A having upstanding barriers or guards positioned on the opposing edges thereof. Recesses or voids 35A and 37A are defined between the walking surface 31A and portal 23A of the cab and the edge 28AA of the floor surface 25AB respectively. These recesses are dimensioned to receive the hand rail structure which would be mechanically associated with the door of the aircraft being serviced. As further illustrated, the assembly 29A may also include a pair of vertically positioned guards or hand rails 33A, which may function in a protective sense in the absence of a hand rail arrangement being present on the door of the aircraft.

Figure 11:
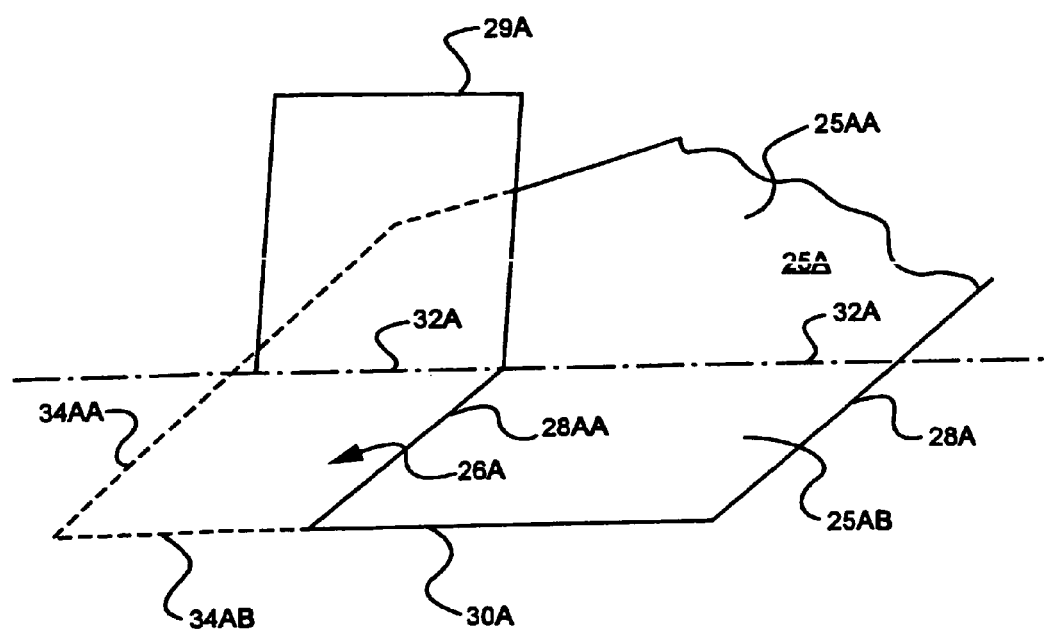
FIG. 11 is a partial elevated perspective view of a cab floor assembly of the instant invention.
Figure 13:
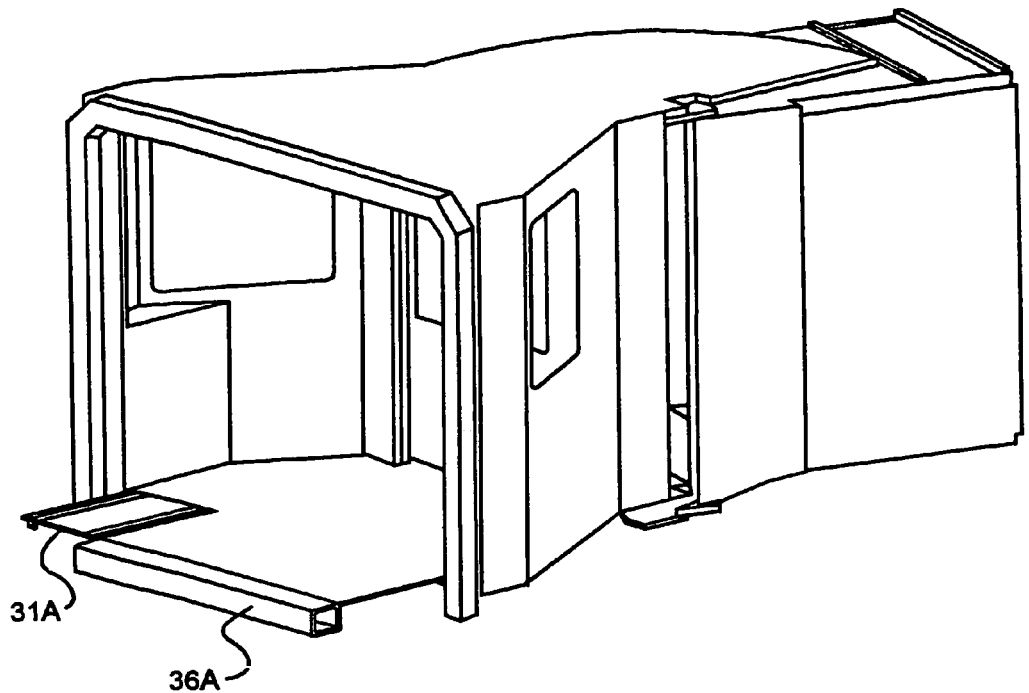
FIG. 13 is a further elevated view of a boarding bridge illustrating the first, second and third floor panels of an adaptable cab floor assembly in an extended orientation.
Figure 14:
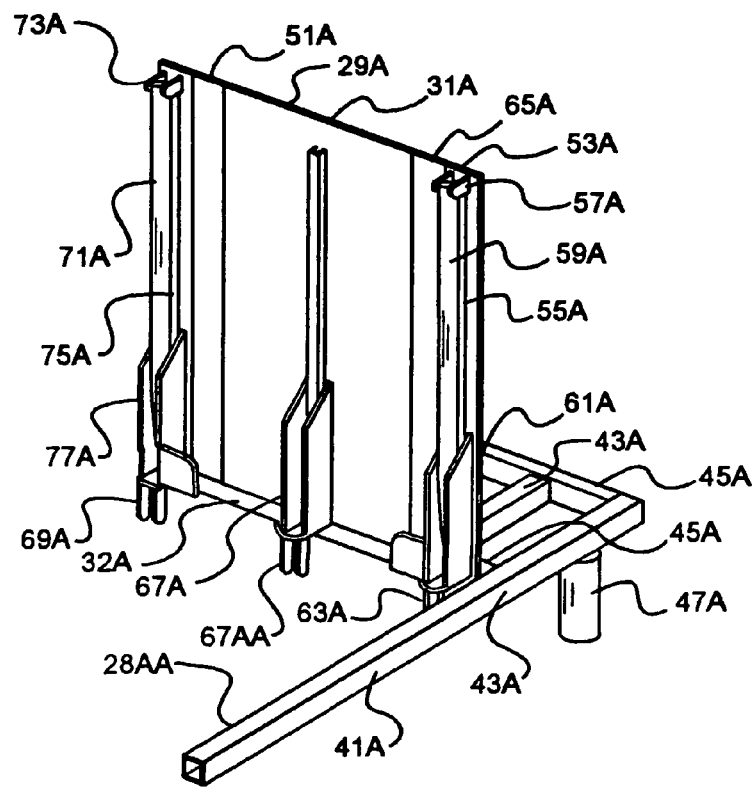
FIG. 14 is an elevated partial perspective view of the adaptable cab floor assembly with the first, second and third floor panels in a retracted condition.

FIG. 14 illustrates the multi-segmented assembly 29A in greater detail. As shown, a frame structure 41A is formed of a number of elongate frame members 43A which are positioned in spaced, parallel relationship to one another. The frame members 43A are interconnected to one another by cross members 45A which are positioned orthogonal to the frame members 43A and are spacedly positioned from one another. The frame members 43A and 45A are connected to one another at their various intersections or junctures to form a frame structure having an upper surface suited for receiving a planar panel. The panel, which forms the floor element 25A, is connected to the frame structure to define a walking surface. Positioned along the leading edge 32A of the frame 41A is a multi-segmented assembly 29A. The assembly includes a centrally positioned first floor panel 31A, a second floor panel 53A which is positioned intermediate the first floor panel 31A and the edge 28AA of the floor section 25AB, and a third floor panel 51A which is positioned on the side of the panel 31A opposite from that occupied by the second panel 53A. Each of the panels 31A, 53A, and 51A are adapted for rotation about the imaginary line or axis 32A shown in FIG. 11. Each panel is positionable in a retracted orientation as illustrated in FIG. 14 and a multitude of extended orientations as will be discussed later.

FIGS. 14–20 depict the first floor panel 31A as including a generally planar upper surface having a quadrilateral, e.g., rectangular, perimeter. This upper surface is formed by a planar panel which is secured to a frame element 65A which is positioned adjacent the panel. The frame element 65A includes an elongate section which extends generally along the complete length of the panel and is positioned substantially along the central longitudinal axis of the panel. A pair of support panels 67A is mounted to the elongate section spacedly about the elongate section near the proximal end of that section. The supports terminate in a pair of spacedly oriented ears 67AA which form a clevis adapted to interconnect the first panel with an axle or axis of rotation (not shown). The first panel 31A may be interconnected to a powered driving structure 62A adapted for rotating the panel about its axis of rotation. Various power structures 62A are contemplated, including electric and hydraulic powered motors.

Figure 15:
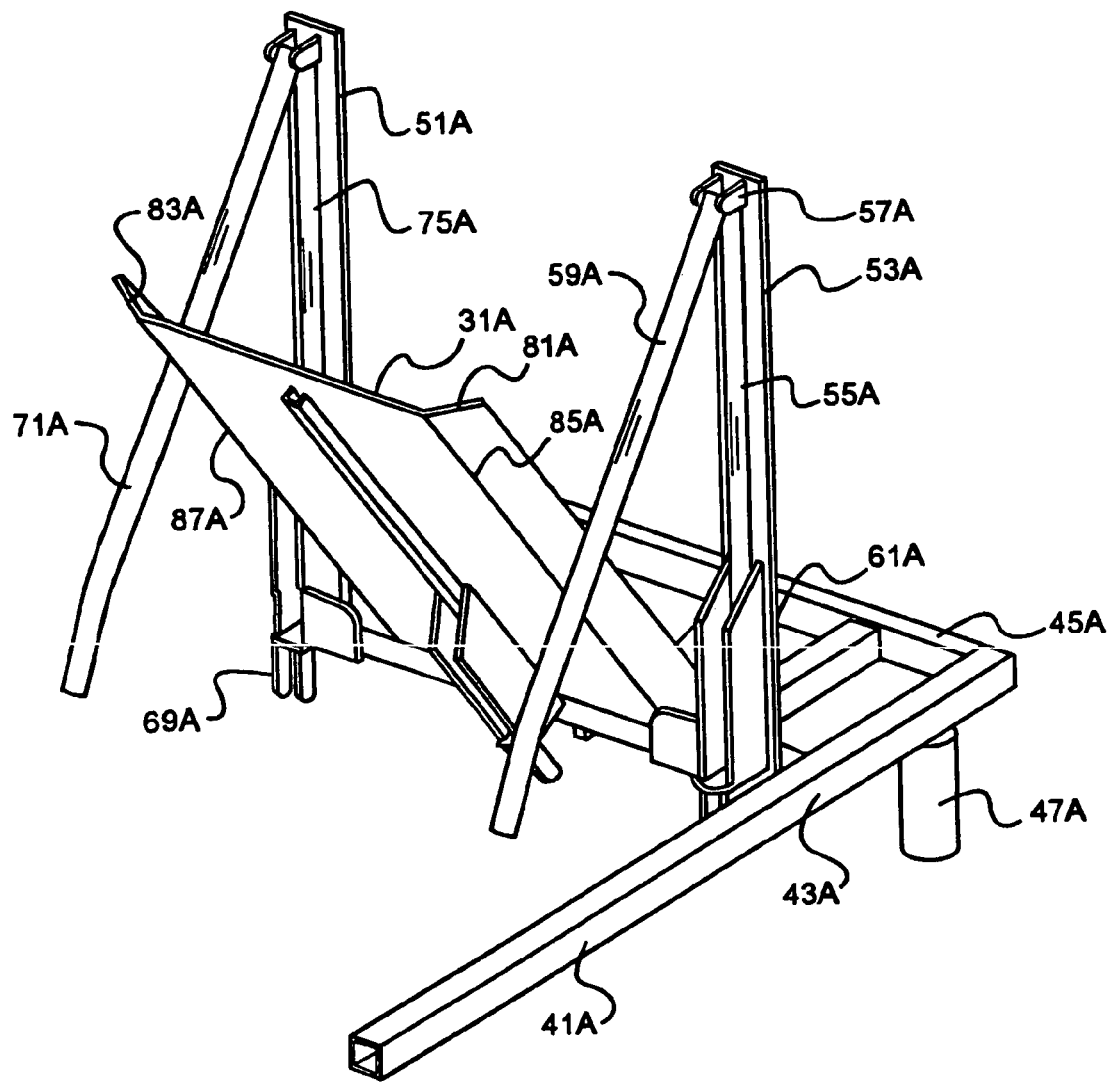
FIG. 15 is an elevated partial perspective view of the cab floor assembly illustrating the first floor panel in the process of being extended.
Figure 17:
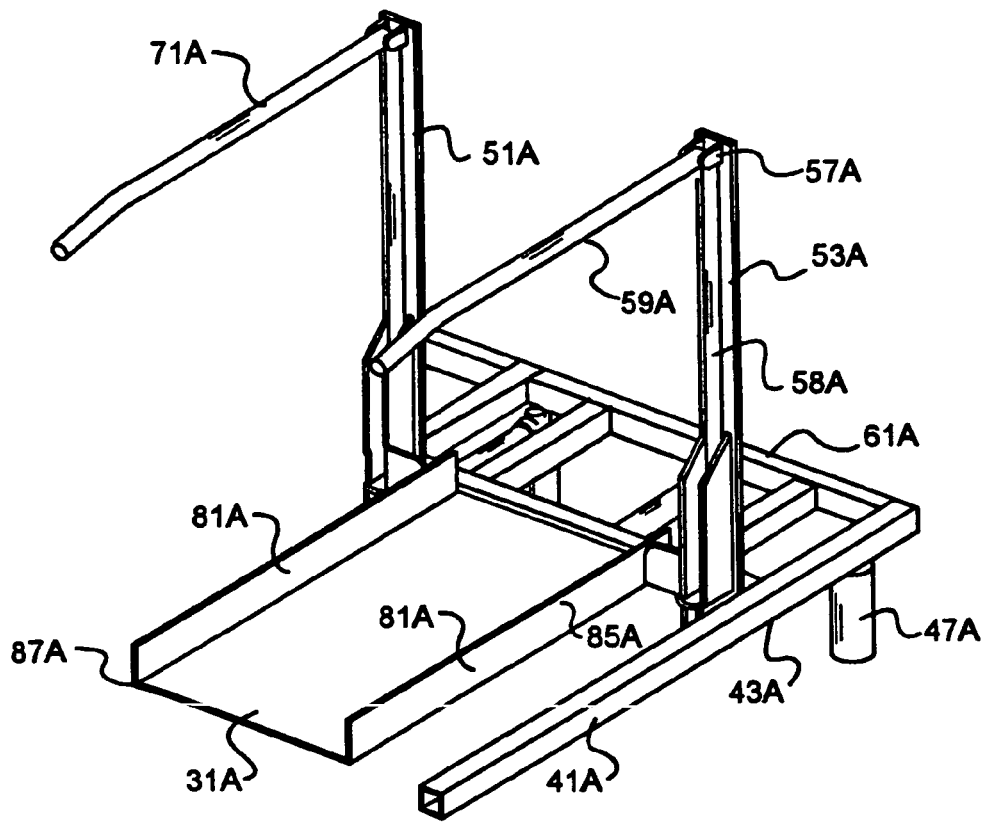
FIG. 17 is an elevated partial perspective view of the cab floor assembly illustrating the first floor panel extended to a generally horizontal orientation.
Figure 18:
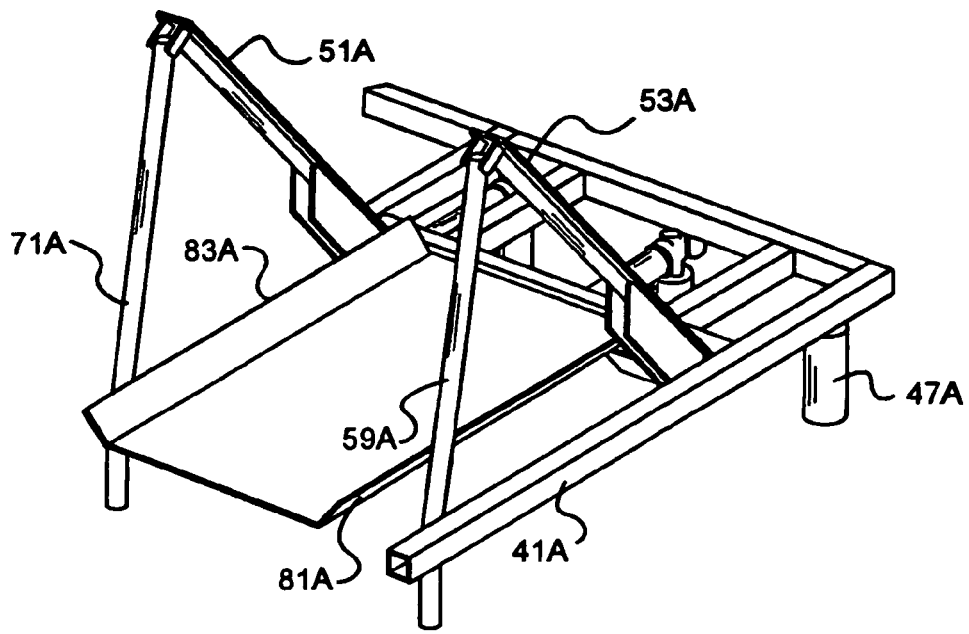
FIG. 18 is an elevated partial perspective view of the cab floor assembly with the side panels of the first panel being positioned in abutment against the support structure of the second and third floor panels.

The first floor panel may, in some embodiments, include one or more side panels. As shown in FIG. 15, the first panel 31A is fitted with a first side panel 81A which is rotatably secured to the longitudinal edge 85A of the panel 31A and a second side panel 83A which is rotatably secured to the longitudinal edge 87A of the first floor panel 31A. Each of these side panels 81A and 83A is adapted for form an upstanding barrier or guard for the edge of the first floor panel 31A. For example in the depiction of the assembly shown in FIG. 17, the first floor panel is deployed in an extended orientation. Each of the side panels 81A and 83A are shown upstanding and forming a boundary or guard for the longitudinal edges of the first floor platform for limiting access to the open areas on either of the longitudinal sides of the first floor panel. In FIG. 18 the side panels are illustrated as positioned against the frame elements of the second and third panels. In this latter orientation, the side panels are positioned in an angulated orientation as opposed to being positioned vertically upright.

The second floor panel 53A includes an elongate, preferably quadrilaterally configured upper surface panel which surmounts an underlying frame structure. The upper surface panel is generally planar in configuration. Similar to the first floor panel the frame structure includes an elongate section which extends generally over the length of the floor panel and is positioned parallel to the central longitudinal axis of the floor panel. In contrast to the first floor panel, the frame structure of the second floor panel includes a pair of ears 57A which are secured to the frame structure proximate the distal end of the frame structure. These ears 57A form a clevis in which an auxiliary frame element 59A is rotatably secured. As shown the element 59A may be a generally cylindrical member which is mounted on an axle secured in apertures defined in the ears 57A. Element 59A is dimensioned to have a length substantially identical to that of the frame section 58A of the second floor panel. This dimensioning of the member 59A permits the member to function as a hand rail when oriented as shown in FIG. 17. Alternatively, the member 59A may be oriented as shown in FIG. 18 whereby the member 59A in association with the frame element 58A forms a substantially isosceles triangle shaped barrier assembly. The frame structure of the second floor panel also includes a pair of supports 61A which are secured thereto proximate the proximal end of the floor panel. Similar to the first floor panel these supports extend to form a pair of aperture defining ears configured to receive an axle for mounting the second floor panel for rotation about the axis 32A. In preferred constructions, the axis of rotation for all three of the floor panels, i.e., the first, second and third floor panels, is the axis 32A. Alternative constructions may utilize respective axis of rotation which are not co-linear in orientation. Fundamental to the invention is the provision of a multiple number of adjacently positioned floor panels which are rotatable in a vertical plane whereby the floor panels may be selectively positioned relative to one another to form an embarkation platform while accommodating for the structure of the airstair, handrails and general structure of the door of the aircraft being serviced. It follows that while the instantly disclosed embodiment utilizes three floor panels in its construction, the invention is not limited to embodiments which employ three floor panels. In contrast, the invention contemplates embodiments utilizing two or more floor panels.

The third floor panel 51A is similar in construction to the second floor panel 53A in that it includes a planar upper surface which surmounts a frame structure constructed from an elongate section and an auxiliary member 71A rotatably secured in a clevis formed by ears 73A. The proximal end of the frame structure is adapted with a pair of supports mounted on either side of the elongate frame member. These supports terminate in a pair of ears which define respective apertures for receiving an axle to define an axis of rotation. The third floor panel, in common with the first and second floor panel, is also fitted with a respective drive structure 64A adapted for drivingly rotating the third floor panel about its axis of rotation.

Figure 16:
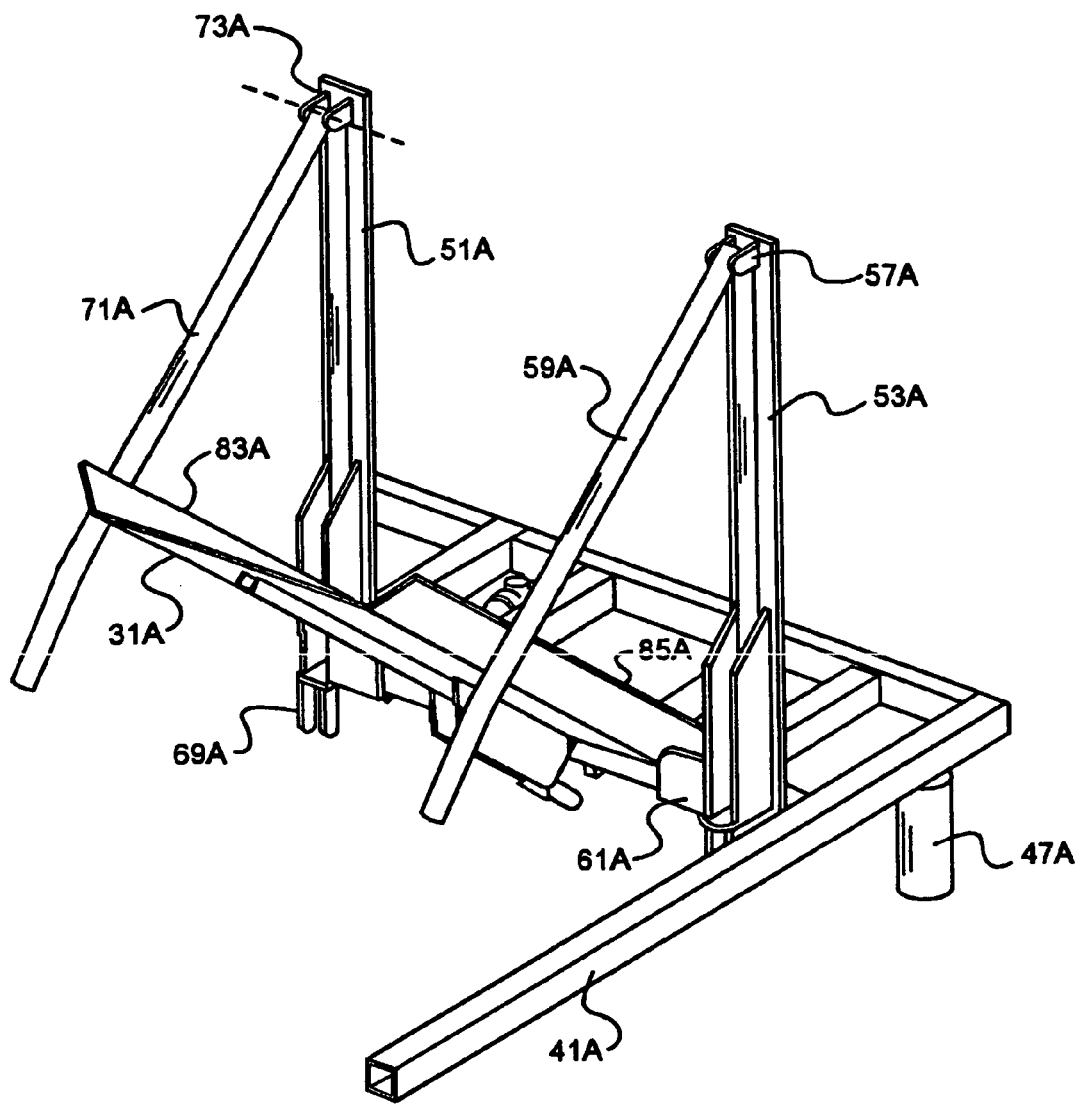
FIG. 16 is an elevated partial perspective view of the cab floor assembly illustrating yet a further extension of the first floor panel.

FIGS. 14–21 illustrate the rotation of the assembly 29A from the fully retracted position shown in FIG. 14 to a number of alternative orientations designed to service aircraft door configurations of various commercial aircraft. In the orientation illustrated in FIG. 14, the assembly 29A is fully retracted thereby exposing the slot 26A. In this orientation, the operator may position the cab floor proximate the door of a commuter aircraft having a door which rotates about a horizontal axis. With the cab floor positioned proximate the aircraft, the door may be opened by passing the opening door structure through the slot 26A. When the door has reached its opened condition, the first floor panel 31A may be rotated in a counterclockwise direction by activating its respective drive structure 62A. FIGS. 16–18 illustrate the various steps necessary to position the upper surface of the first floor panel 31A in a generally horizontal orientation. Depending on the particular arrangement of the airstair and hand rails of the commuter aircraft, the second and third floor panels may be retained in the orientation shown in FIG. 14 or alternatively they may be extended as shown in FIGS. 15–18.

FIG. 17 contemplates a handrail construction being associated with the airstair. The spacing of the first floor panel and the second and third floor panels is such that a hand rail may be received between the first floor panel 31A and the second floor panel 53A as well as a hand rail being received between the first floor panel and the third floor panel. The side panels 81A and 83A are positioned in a generally upright orientation thereby functioning as kick guards for the embarkation surface formed by the first floor panel.

The auxiliary members 59A and 71A are positioned to extend outwardly toward the fuselage of the aircraft to form an auxiliary barrier for the assembly. FIG. 18 illustrates a configuration of the frame structure of the second and third floor panels whereby the panels form an isosceles shaped barrier structure for the embarkation platform. In this particular configuration, the side panels 81A and 83A are positioned in an angulated orientation relative to the vertical and are abutted against the upstanding framework formed by the second and third floor platforms.

Figure 19:
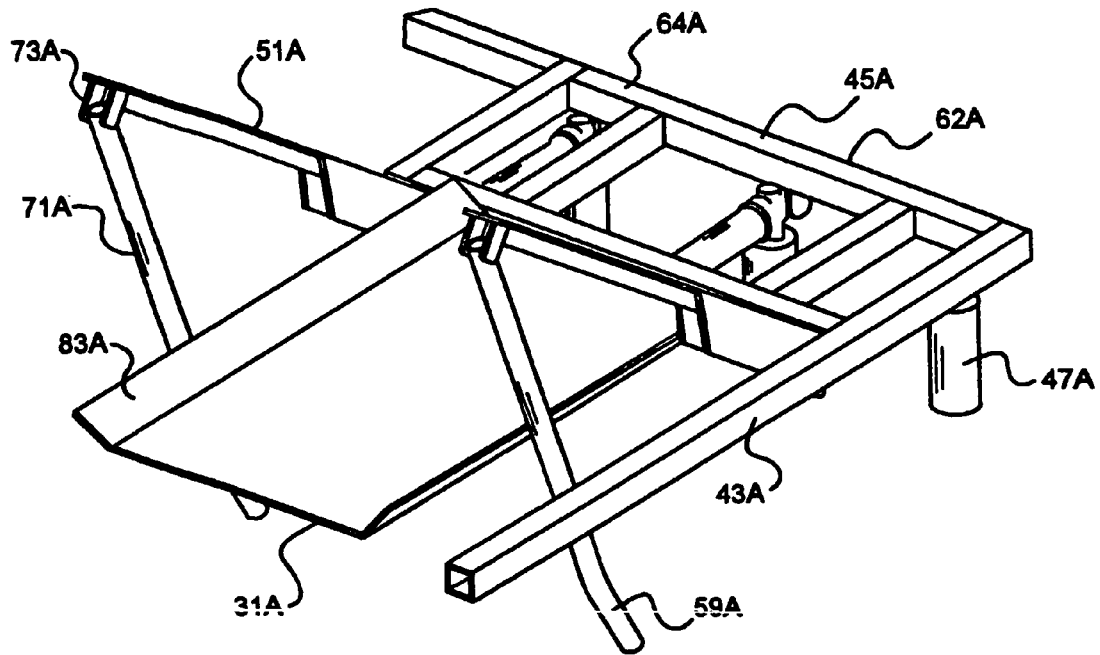
FIG. 19 is an elevated partial perspective view of the cab floor assembly illustrating the second and third floor panels being displaced to an extended orientation.
Figure 20:
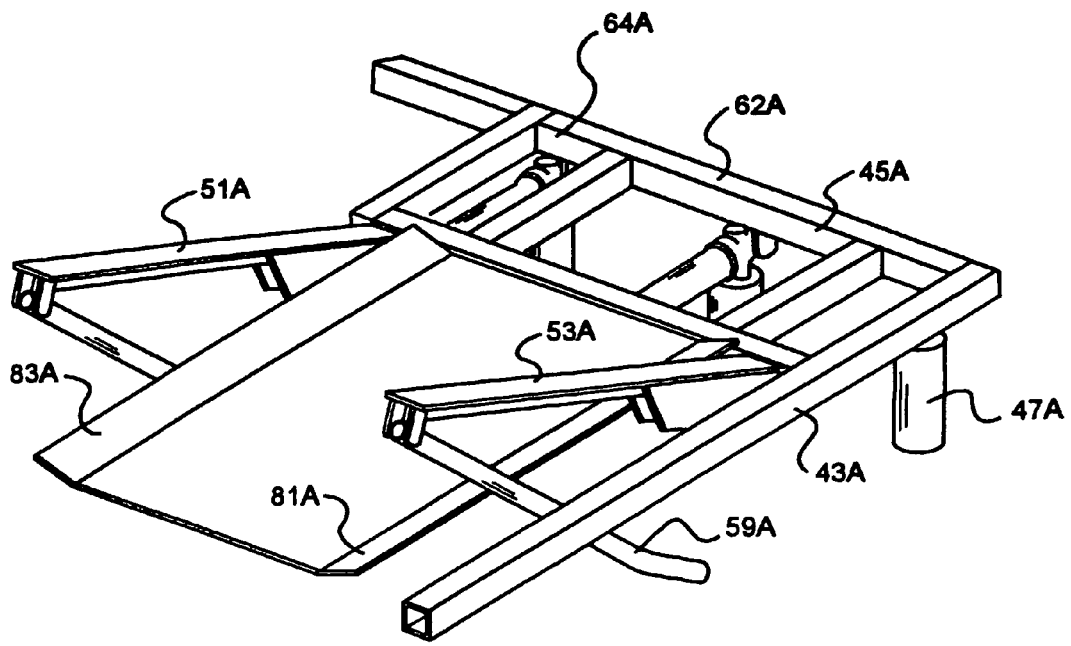
FIG. 20 is an elevated partial perspective view of the cab floor assembly illustrating a further displacement of the second and third floor panels to an extended orientation.
Figure 21:
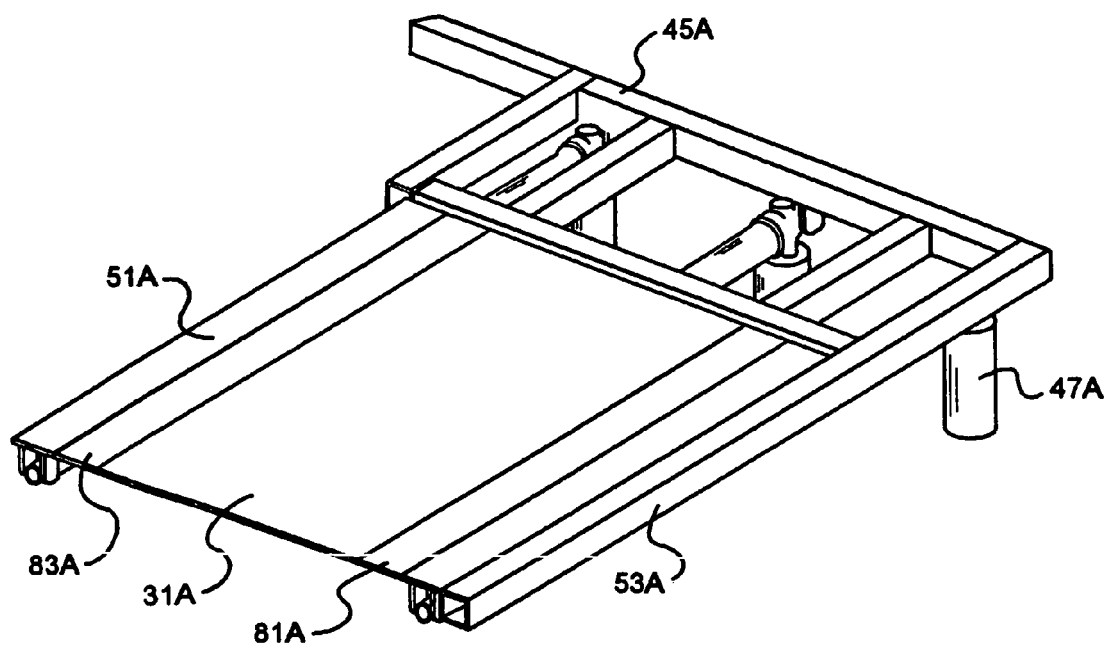
FIG. 21 is an elevated partial perspective view of the cab floor assembly illustrating the disposition of the first, second and third floor panels in an extended orientation.

FIGS. 19–21 illustrate the full extension of the second and third floor panels to form a contiguous, co-planar orientation of the upper panels of the three floor panels. In this configuration, the side panels 81A and 83A are positioned over atop a portion of the upper surfaces of the second and third floor panels respectively. In the configuration of FIG. 21, the cab floor assembly is adapted to service conventional aircraft having a door assembly which rotates about a vertical axis.

Figure 22:
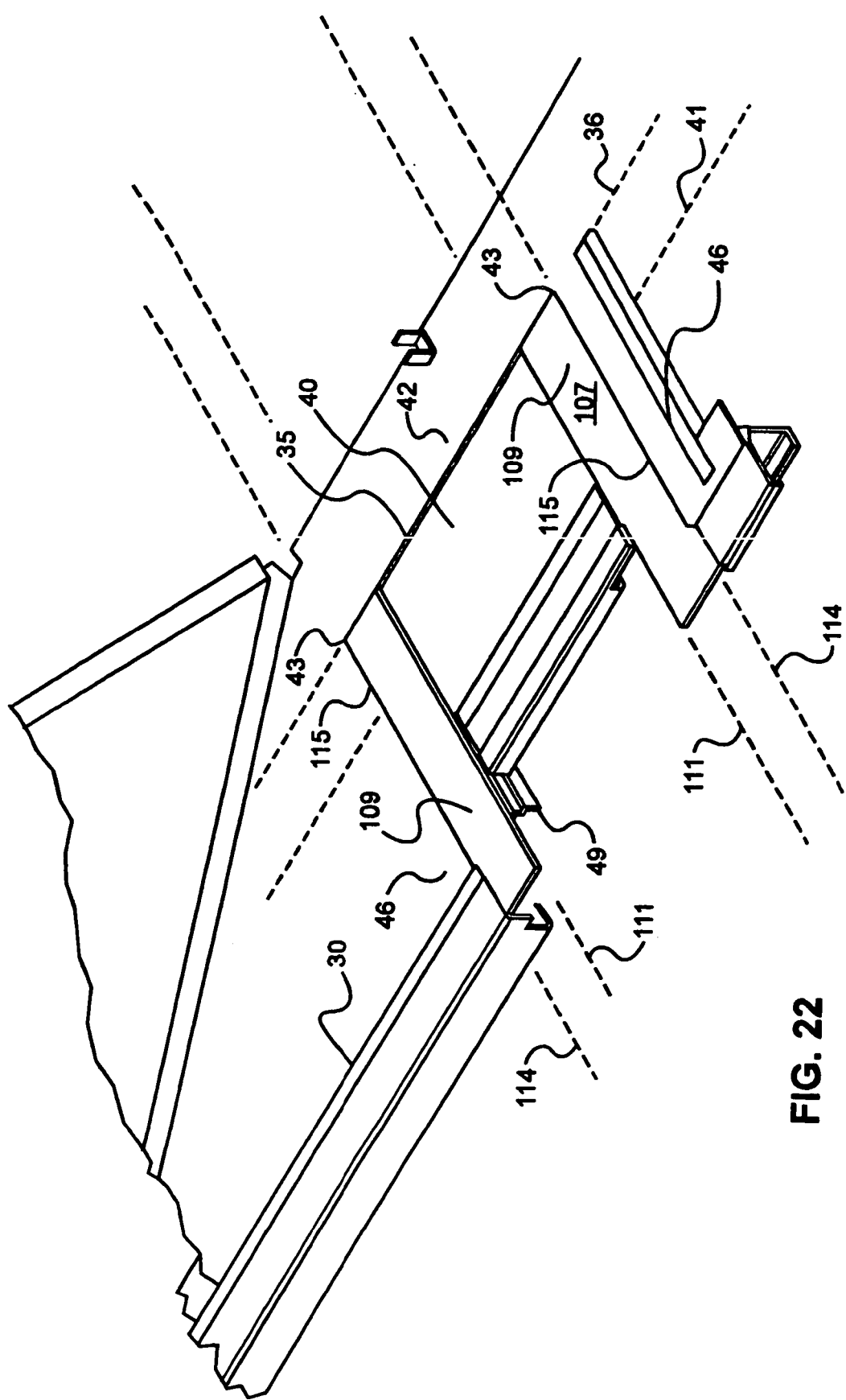
FIG. 22 is an elevated perspective view of an alternative embodiment of the cab floor assembly.
Figure 23:
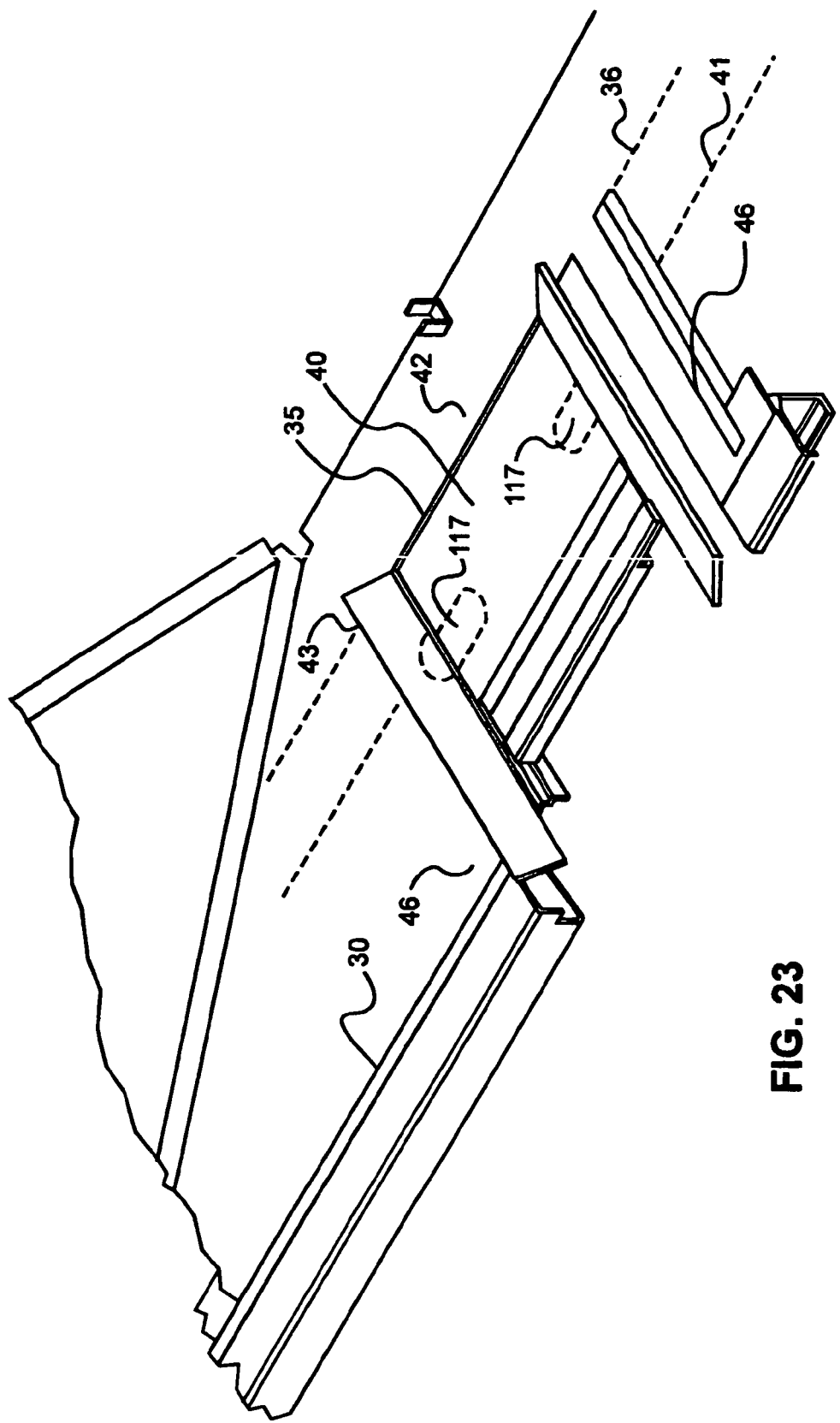
FIG. 23 is a perspective view of the assembly in FIG. 22 with the side panels in an inclined orientation.
Figure 24:
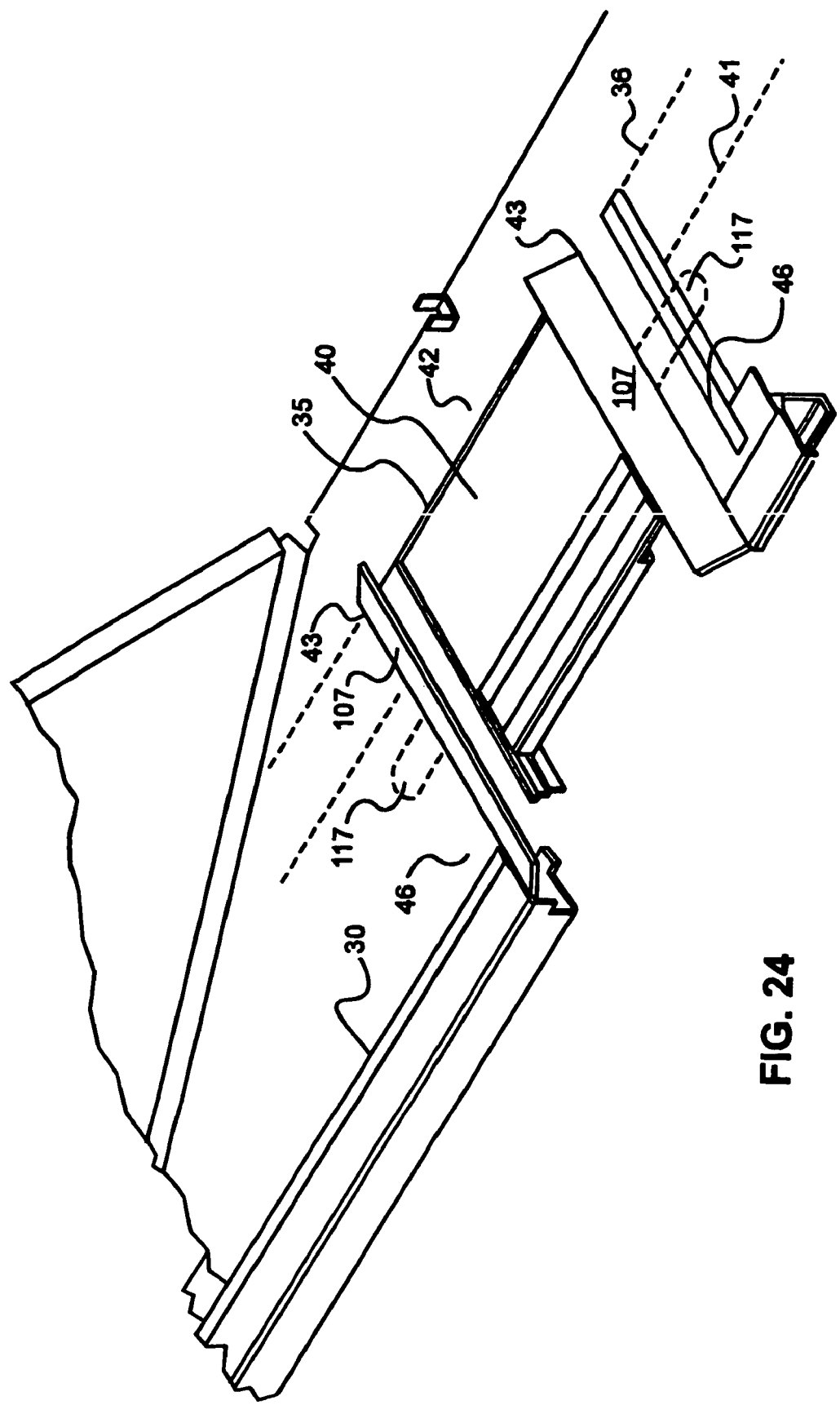
FIG. 24 is an alternative configuration of the embodiment of FIG. 22 with the side panels in an inclined orientation.

A further embodiment of the invention is illustrated in FIGS. 22–24. As shown, each of the siderails 49 of the first floor panel may be fitted with a respective side panel 107. Each side panel 107 is an elongate, rectangularly configured panel having a planar upper surface 109 which forms a floor surface. The proximal longitudinal edge 113 of each side panel 107 is hingedly mounted to a respective side rail 49 to permit its rotation about a horizontal axis 111. The distal longitudinal edge 115 of the side panel is dimensioned to rest atop a ledge formed by the underlying frame of the floor whereby the plane of the side panel may be positioned substantially co-planar with the remainder of the cab floor where the side panel 107 is in the orientation shown in FIG. 22.

Each of the side panels 107 may be fitted with a hydraulic cylinder arrangement 117. The arrangement 117 is secured to the first panel assembly and is structured to rotate the side panel 107 about its respective axis 111. Cylinder arrangement 117 provides a means of power actuating the movement of the side panels 107. In alternative construction, the panels 107 may be constructed to permit manual rotation about their respective axis of rotation 111.

FIG. 24 illustrates an alternative construction wherein the side panels 107 are pivotally secured to the frame of the cab floor as opposed to the first floor panel assembly. In this construction the side panels are adapted to rotate about axis of rotation 121. FIG. 24 illustrates the side panels being raised into an inclined position. As in the embodiment of FIG. 23, the side panels 107 in FIG. 24 may each be fitted with a hydraulic cylinder driven actuation mechanism 125 which is adapted to drivingly rotate the respective side panel 107 about its axis of rotation. Alternatively, the panels 107 may be constructed for manual actuation.

In both the illustrated embodiments of FIGS. 22–24, the side panels may be displaced from a generally horizontal orientation to an inclined orientation, e.g., as shown in FIGS. 23 and 24. Upon being displaced, each side panel reveals an underlying open slot which is dimensioned to receive upstanding structure of an aircraft door assembly, e.g., to permit the upward passage of the handrails of the door of a commuter-type aircraft. The side panels may be adjusted in orientation to form an upstanding edge for the first panel assembly.

The present invention has been described in detail with reference to specific embodiments. The invention may be embodied in other specific forms without departing from its spirit or essential characteristics. The described embodiments are to be consider in all respects only as illustrative and not restrictive. The scope of the invention is therefore indicated by the appended claims rather than by the foregoing description. All changes which come within the meaning and range of equivalency of the claims are to be embraced within their scope.

What is claimed is:

1. An aircraft engagement assembly comprising:
   a frame, said frame defining a main floor and a support structure for said main floor, said main floor defining an elongate slot therein dimensioned to permit the passage there through of a vertically rotating door of an aircraft parked adjacent said main floor, said aircraft door being pivoted to rotate about a horizontal axis;
   a first floor panel having a first end, said first floor panel being positioned within said slot and pivotedly secured at said first end to said main floor for vertical pivoted movement about said first end and substantially out of said slot, sufficient to permit the passage through said slot of said aircraft door, said first floor panel defining a first floor surface; and
   a length extendible second floor panel, secured to said first floor panel, said second floor panel being arranged for reciprocal displacement away from and toward said first floor panel in a direction perpendicular to a generally horizontal rotational axis of said first floor panel
   wherein said first floor panel and said second floor panel are rotatable about said first end into a position to form a passageway into said aircraft.

2. The aircraft engagement assembly of claim 1 wherein said second floor panel defines an edge which forms a portion of a perimeter of said main floor.

3. The aircraft engagement assembly of claim 1 wherein said second floor panel is slidably displaceable relative to said first floor panel.

4. The aircraft engagement assembly of claim 3 further comprising a control console associated with a cab, said first floor panel being positioned intermediate said control console and said second floor panel.

5. The aircraft engagement assembly of claim 4 further including a drive structure associated with said first floor panel for drivingly rotating said first floor panel about said generally horizontal axis.

6. An aircraft engagement assembly comprising:
 a frame, said frame defining a floor, said floor defining a slot therein dimensioned to permit the passage there through of a vertically rotatable door of an aircraft parked adjacent to said floor;
 a first floor panel displaceably positioned within said slot and rotatably associated with said frame, said first floor panel having a first end and an opposing second end, said first floor panel being arranged for pivoted rotation about a generally horizontal axis, said generally horizontal axis being oriented collinearly with said first end, said first floor panel defining a first floor surface; and
 a second floor panel, mechanically connected to said first floor panel for slidable displacement along said first floor panel, said second floor panel being slidably associated with said first floor panel for motion along a direction perpendicular to said horizontal axis, said second floor panel defining a second floor surface.

7. The aircraft engagement assembly of claim 6 further comprising a drive structure for forcibly sliding said second floor panel along said first floor panel.

8. The aircraft engagement assembly of claim 6 wherein said first and second floor panels are disposed within an opening defined within said floor.

9. The aircraft engagement assembly of claim 6 wherein said frame further defines a control area for housing controls for activating said first and second floor panels.

10. The aircraft engagement assembly of claim 9 wherein said control area is positioned on a left side of said aircraft engagement assembly from the vantage point of a user exiting the aircraft engagement assembly and entering an aircraft.

11. The aircraft engagement assembly of claim 10 wherein said first floor panel is positioned intermediate said control area and a leading edge of said aircraft engagement assembly.

12. An aircraft engagement assembly comprising:
 a frame, said frame including a main floor and a support structure, including a cab, said main floor defining an elongate slot therein, said floor being pivotally associated with said frame and said cab;
 a first floor displaceably positioned within said slot and pivotally associated with said main floor for rotation about a generally horizontal first axis, said first floor defining a first floor surface; and
 a second floor, positioned within said slot and displaceably associated with said first floor panel, for extension and retraction generally along a direction of travel perpendicular to said first horizontal axis, said second floor defining a second floor surface.

13. The aircraft engagement assembly of claim 12 wherein said second floor panel is positioned adjacent said first floor panel.

14. The aircraft engagement assembly of claim 12 further comprising structure for displacing said second floor panel slidingly within said first floor panel.

15. The aircraft assembly of claim 12 further including a drive structure for drivingly rotating said first floor panel about said horizontal axis.

16. An aircraft engagement assembly comprising:
 a frame;
 a floor positioned on said frame, said floor defining an elongate slot therein;
 a retractable floor panel positioned within said elongate slot and mechanically associated with said frame, said retractable floor panel being configured for vertical rotation, about a horizontal axis, substantially out of said elongate slot to permit the passage through said slot of a vertically rotating door of an aircraft parked adjacent to said aircraft engagement assembly, said horizontal axis being oriented perpendicular to a direction of travel of said floor panel during a retraction movement thereof.

17. The aircraft engagement assembly of claim 16 wherein said retractable floor panel is also extendable.

18. The aircraft engagement assembly of claim 16 further comprising a drive structure for forcibly retracting said floor panel.

19. The aircraft engagement assembly of claim 16 further comprising a drive structure for forcibly rotating said floor panel about said horizontal axis.

* * * * *